United States Patent
Mandaviya et al.

(10) Patent No.: US 10,853,424 B1
(45) Date of Patent: Dec. 1, 2020

(54) CONTENT DELIVERY USING PERSONA SEGMENTS FOR MULTIPLE USERS

(71) Applicant: Amazon Technologies, Inc., Seattle, WA (US)

(72) Inventors: Chirag Natvarlal Mandaviya, Bellevue, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 15/676,770

(22) Filed: Aug. 14, 2017

(51) Int. Cl.
    G06F 16/00 (2019.01)
    G06F 16/951 (2019.01)
    G06N 7/00 (2006.01)

(52) U.S. Cl.
    CPC .......... G06F 16/951 (2019.01); G06N 7/005 (2013.01)

(58) Field of Classification Search
    USPC ......................................................... 707/748
    See application file for complete search history.

(56) References Cited

U.S. PATENT DOCUMENTS

| | | | | |
|---|---|---|---|---|
| 7,813,822 B1* | 10/2010 | Hoffberg | ............ | G06K 9/00369 381/73.1 |
| 8,706,739 B1* | 4/2014 | Song | .................... | G06F 16/9535 707/748 |
| 9,805,324 B2* | 10/2017 | Ding | ..................... | H04L 47/823 |
| 2003/0225785 A1* | 12/2003 | Arellano | ................ | G06F 16/337 |
| 2007/0050191 A1* | 3/2007 | Weider | ..................... | G10L 21/06 704/275 |
| 2007/0156677 A1* | 7/2007 | Szabo | .................. | G06F 16/2457 |
| 2007/0168863 A1* | 7/2007 | Blattner | .................. | H04L 51/04 715/706 |
| 2009/0254971 A1* | 10/2009 | Herz | ....................... | G06Q 30/02 726/1 |
| 2010/0332583 A1* | 12/2010 | Szabo | ................... | G06F 16/248 709/202 |
| 2011/0054991 A1* | 3/2011 | Orellana | ................. | G06Q 30/02 705/14.23 |
| 2012/0272162 A1* | 10/2012 | Surin | ....................... | H04L 67/38 715/753 |
| 2013/0080927 A1* | 3/2013 | Weaver | ................. | H04L 67/306 715/758 |
| 2013/0097664 A1* | 4/2013 | Herz | ....................... | G06Q 10/10 726/1 |

(Continued)

*Primary Examiner* — Hanh B Thai
(74) *Attorney, Agent, or Firm* — Eversheds Sutherland (US) LLP

(57) ABSTRACT

Systems, methods, and computer-readable media are disclosed for content delivery using persona segments for multiple users. In one embodiment, an example method may include receiving user interaction data from a user device for a session associated with a user account, wherein the user interaction data comprises indications of user interaction of interaction by a user account with a website. A set of keywords may be determined based on the product identifiers. A set of persona segments may be determined based on the keywords. Inter-persona distances between each persona segment of the set of persona segments may be determined. The inter-persona distances may be used to determine that multiple users are using a user account. A persona segment corresponding to a user may be selected. A content may be identified based on the persona segment.

20 Claims, 14 Drawing Sheets

(56) References Cited

U.S. PATENT DOCUMENTS

| | | | |
|---|---|---|---|
| 2015/0007055 A1* | 1/2015 | Lemus | G06F 3/0354 |
| | | | 715/753 |
| 2016/0132590 A1* | 5/2016 | Byron | G06F 16/338 |
| | | | 707/734 |
| 2017/0078221 A1* | 3/2017 | Ding | G06Q 30/0202 |
| 2017/0160918 A1* | 6/2017 | Torbey | G06F 3/048 |
| 2019/0026836 A1* | 1/2019 | Milkovich | G09B 19/18 |

* cited by examiner

CONTENT DELIVERY USING PERSONA SEGMENTS FOR MULTIPLE USERS

BACKGROUND

Users may interact with content using different types of devices, such as a laptop, smartphone, tablet, wearable technology, smart speakers, or the like. Content may be selected and displayed to the user based on, for example, the preferences of the user or browsing history of the user. In many instances, content selection for a user may be made in response to an action of the user, such as reading a review, searching for related content, or purchasing a content item. However, users have different intentions during different user interactions. For instance, at one point the user may be searching for baby content, while at another point the user may be searching for automotive content. Delivering relevant content related to baby products while the user is searching automotive content, which may be irrelevant to the user at that point, may diminish the user experience.

Figure 1A:
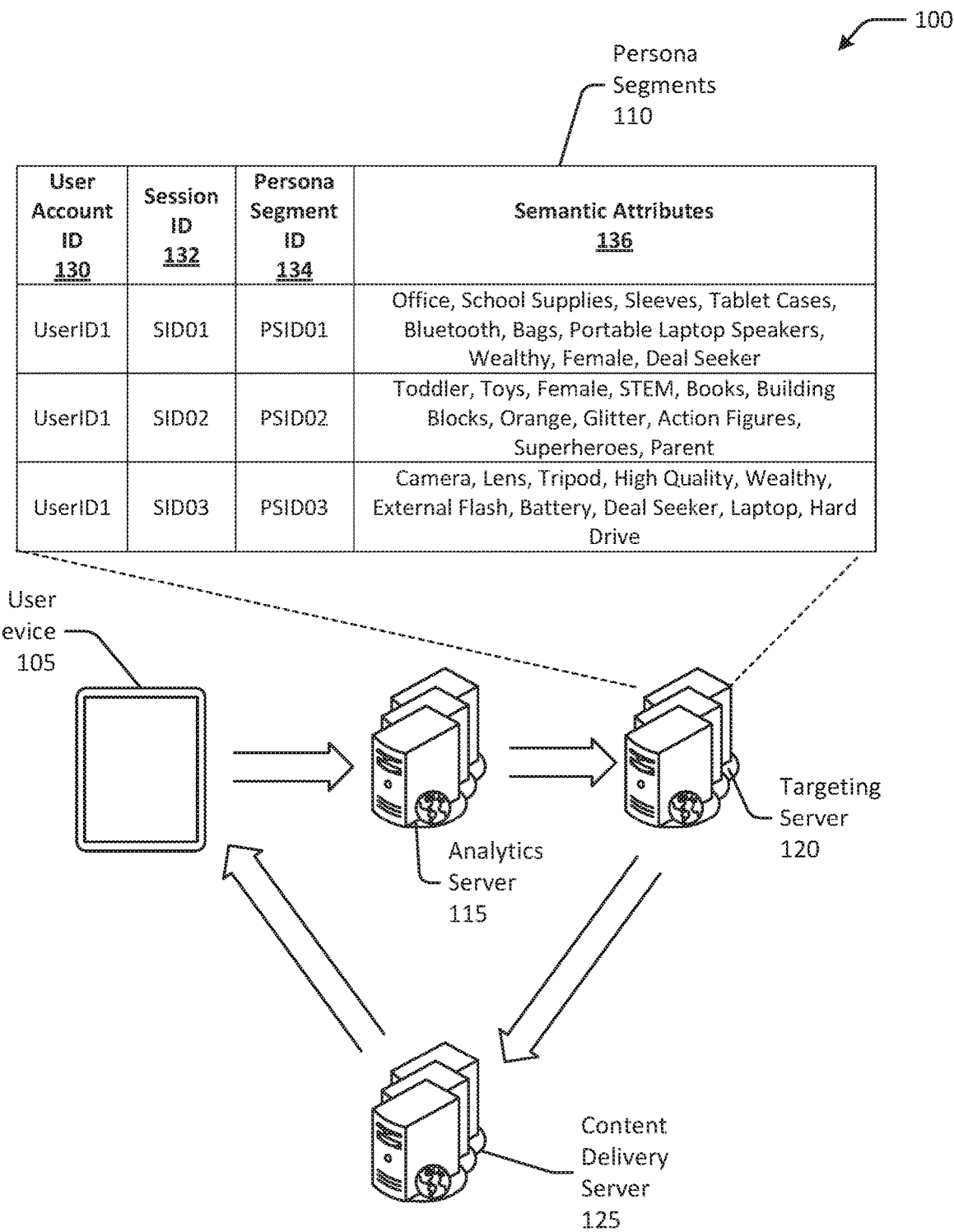
FIG. 1A is a data flow diagram for content delivery based on persona segments in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods described herein are directed to content delivery based on persona segments. Persona segments may be indicative of multiple dimensions of user attributes, such as interests, income, gender, life stage, or the like. In some embodiments, persona segments may be indicative of a semantic theme based on products or content searched and browsed during a session. The semantic theme of a session may be based on commonality (e.g., semantic relationship) between various products or content viewed during a session. The commonality between different content and products may be derived from a descriptor (e.g., keywords or descriptive terms) for each content or product. Descriptors may be a set of words that describes the content or product. Using these keywords, semantic attributes for a persona segment may be generated. Personas may have several dimensions of attributes. For example, personas may have a product category attribute (e.g., "garden", "fashion", "baby", "gadgets", "sports", etc."), a life stage attribute (e.g., "single", "family", "parent", "retired", etc.), an affluence attribute (e.g., "wealthy", "care provider" "student" "dependent", etc.), and/or a motivation attribute (e.g., "brand-conscious", "commodity", "deal-seeking", "convenience", etc.).

Browse taxonomy information may be data of an organization system for assets, such as products, media assets, services, or the like. Browse taxonomy information may include data to categorize and organize assets and related information. For example, products may be organized in a hierarchy of nodes, where each node corresponds to a category of products and is related to a collection of items. In some embodiments, the nodes of the hierarchy of nodes may be referred to as "browse nodes" because users can browse through the nodes to find the collection of items that interests them. For example, users may select a browse node for "Biographies" and products that are categorized as biographies or associated with the browse node for "Biographies" may be displayed to the user. Browse nodes may be related in a hierarchical structure where different levels can be used to catalog and find items. The browse nodes in the hierarchical structure may progress from general to specific, where navigating down the tree refines the search for items from general to more specific.

In some embodiments, personas of a user interacting with an online website, device (for instance, a smartphone, tablet, laptop, desktop computer, television, Internet of Things device, etc.), or service, during a session, may be automatically defined and detected. While a session may include user interaction data indicative of a user interacting with one or more product groups, categories, and browse nodes, the main theme of a session may be captured and identified as a persona segment, which may reflect a user mindset during their online activity in that session. Persona modeling (e.g., generation and application of personas), based on user interaction data indicative of user interaction with content and an online environment, may be agnostic to demographic data, and thus, may eliminate implicit bias or subtle influences obtained from demographic information which may ultimately lead to inaccurate content selection for a user.

A user may exhibit multiple personas during a session. A dominant persona may be identified and, based on the dominant persona, personalized content may be identified and delivered to a user device of a user account for presentation. In some embodiments, the personas may be used to include persona-based deals, automated discovery of high-value actions based on identified personas, fashion personas, persona-driven explore and discovery, and automated targeting on multiple platforms using personas.

The systems and methods described herein may be segmented into three stages—data preparation, generation of collections of keywords, and persona modeling. Data preparation may be directed to the generation of product or content descriptors for product identifiers. Using a combination of browse-node tree hierarchy and product details description, product identifiers may be mapped to a set of descriptors.

For the generation of collections of keywords, all the product identifiers and corresponding descriptors viewed by a user in a session may be aggregated and a collection of keywords may be identified. The collection of keywords may be referred to as semantic attributes of the session. A collection of keywords may be generated for each session of a user account.

For persona modeling, statistical models may be used to model persona segments from the provided collection of keywords. The statistical model may be a generative probabilistic model to identify personas and assign semantic attributes to personas in multiple collections of discrete data such as text corpora. Persona segments may be generated by the statistical models based on the collection of keywords of sessions. A dominant persona segment may be identified for a session and may be used to generate criteria to obtain relevant content. The content may be obtained and transmitted to a user device of a user account for presentation.

For example, during a session, a user may browse for and research gardening tools, search for books on growing native plans, buy fertilizers and soil amendments, read reviews on leather gloves, add vegetable seeds to an online shopping cart, and purchase a sun hat and sunscreen. Subsequently, later in the session, the same user may search for organic cotton clothes, research baby toys, read reviews on baby wipes, initiate a diaper delivery subscription, and start a lullaby playlist. By processing the user interaction data to identify different personas and identifying a dominant persona for the different portions of the session, the systems and methods described herein may identify relevant content to display to the user during the session.

User accounts may be shared across multiple users. However, many existing systems assume that each account corresponds to a unique individual, and thus, generate personalization, suggest content recommendations, store order histories, register clicks/browsing history and high-value actions, manage address books/shipping addresses, track Shopping Cart, 'Save for Later' lists and wish lists, quantify and measure engagement assuming that all these interactions generated using the user account are by a single person. All observed behavior and engagement activity are lumped into a singular user account, and are treated as a single user, thus diluting the user experience for all the users of the user account with respect to the delivery of relevant content, as well as missed opportunities for targeted engagement for the different users.

Referring to FIG. 1A, an example use case 100 for content delivery based on persona segments for a user account used by a single user in accordance with one or more embodiments of the disclosure is depicted. In the example embodiment depicted in FIG. 1A, user devices 105 may transmit user interaction data from different sessions to an analytics server 115. A session may be represented as a collection of user interaction data generated by one or more devices (e.g., smart speaker, tablet, smart television, smartphone, laptop, etc.) for a user account. A user account may be identified or associated with a user account identifier (ID) 130. In some embodiments, the user account identifier 130 may be a unique identifier that a server assigns to a user. In some embodiments, user data, such as demographic information, payment information, preferences, and the like, may be associated with the user account ID 130.

The session may be identified or associated with a session identifier 132. In some embodiments, the session identifier (ID) 132 may be a unique identifier that a server assigns to a user for the duration of that user's visit (e.g., session). The session ID 132 may be stored as a cookie, form field, or Uniform Resource Locator (URL).

User interaction data may be indicative of actions taken by a user during their interaction with a website or application. Such user interactions, when conducted online, may generate user interaction data that may include user interaction events, such as clicks, hovers, taps, swipes, audible responses, adds to cart, purchase transactions, or the like. In some embodiments, the user interaction data may be associated with a user account ID 130 and/or a session ID 132.

The user interaction data from the user devices 105 may be processed to detect product identifiers and product descriptors. In some embodiments, the data of user interaction events of the user interaction data may be examined to detect product identifiers or product names. A product identifier may be a unique identifier used to identify a product (or service). Examples of product identifiers may include, but are not limited to Amazon Standard Identification Number (ASIN); International Standard Book Number (ISBN); International Standard Serial Number (ISSN); International Standard Music Number (ISMN); Electronic Product Code (EPC); Universal Product Code (UPC), or the like. Product descriptors may be a collection of keywords that are associated with a product. In some embodiments, the product descriptors may include keywords that indicate or correspond to a physical attribute of the product, brand, quantity, product category, or the like. For example, a list of product descriptors for an identifier for a toothbrush may include "toothbrush", type of toothbrush (e.g., manual, electric, pediatric, adult, etc.), physical attributes (e.g., color, size, etc.), quantity (e.g., single, family pack, etc.), brand name, and the like.

The product names or product identifiers may be used to obtain product data information associated with the product. For example, a product identifier may be used to obtain a product description from a product catalog. The product identifier may also obtain product metadata that may be associated with the product or product identifier. In some embodiments, keywords may be identified or detected from the product data, metadata, or other information from the user session and may be aggregated to form a collection of keywords for each user session.

The collection of keywords for a product may reflect or indicate a physical characteristic, product category, or the like of a product or service or may be indicative of a characteristic of a user who purchases or views the product or service. For example, if a product goes on sale (e.g., the price of the product is reduced), a keyword that may be associated with the product may be "deal seeker." If the product is of high quality or a known luxury brand, a keyword that may be associated with the product may be "high-quality" or "brand-conscious." The collection keywords of one or more sessions for any number of products may be transmitted to a targeting server 120.

In some embodiments, additional information from the user interaction data may also be transmitted to the analytics server 115. For example, session metadata associated with a session may be identified and transmitted to the analytics server 115 with the collection of keywords. For example, a user account identifier 130 associated with the session and a session identifier 132 of the session may be identified and transmitted with the collection of keywords.

The targeting server 120 may receive the collection of keywords from the analytics server 115. The targeting server 120 may use the collection of keywords to identify one or more persona segments 110 associated with the user account identifier 130. In some embodiments, the targeting server 120 may provide the collection of keywords as input to a machine learning algorithm for topic modeling to identify one or more persona segments 110. Examples of machine learning algorithms for topic modeling may include, but are not limited to, such as Latent Dirichlet Allocation, Nonnegative Matrix Factorization, Explicit Semantic Analysis, Latent Semantic Analysis, Hierarchical Dirichlet process, and the like.

The targeting server 120 may identify a set of persona segments 110 associated with the collection of keywords of a session (e.g., associated with a session ID 132). Persona segments 110 may also include the user account identifier 130, session identifier 132, and semantic attributes 136 of a persona segment 110 generated by the machine learning algorithm. The semantic attributes 136 of a persona segment 110 may be based on the keywords of a session.

The targeting server 120 may generate a score for each of the persona segments 110 by comparing the semantic attributes 136 of a persona segment 110 to the collection of keywords. In some embodiments, the score may be indicative of a confidence level that the persona segment 110 corresponds to the collection of keywords. The score may be generated by comparing the number of keywords in the collection of keywords in common with the semantic attributes 136 of the persona segment 110 to the total number of keywords in the collection of keywords. Persona segments 110 that do not satisfy a threshold indicative of a minimum score value may be discarded. For example, if a persona segment 110 was generated based on a single a user interaction event (e.g., clicking on a webpage for a product corresponding to a product identifier), it is unlikely that a persona segment 110 corresponding to the product identifier is relevant to the user or accurately reflects a mindset of the user. In some embodiments, a predetermined number of persona segments 110 may be associated with a user account identifier 130. For example, if the machine learning algorithm identified ten persona segments 110 based on a collection of keywords, and the predetermined number of persona segments 110 is six, then a score may be generated for each of the persona segments 110 and the six persona segments 110 that correspond to the six highest scores may be stored, while the four persona segments 110 with the four lowest scores may be discarded.

Based on the score for the different persona segments 110, the targeting server 120 may determine one or more dominant persona segments 110. In some embodiments, a dominant persona segment may be the persona segment 110 that corresponds to the highest score. In some embodiments, dominant personas may be determined by comparing the scores corresponding to the persona segments 110 to a predetermined threshold and selecting all persona segments 110 that are above the predetermined threshold.

The targeting server 120 may use the semantic attributes 136 of the dominant persona segments 110 to generate target criteria. For example, if a dominant persona segment 110 is indicative of a car enthusiast, the target criteria may be search clauses generated using the semantic attributes of the dominant persona segment 110 (e.g., car enthusiast). An example target criteria may be based on semantic attributes indicating a preference for BMW cars. The target criteria may be used to only include car accessories or parts for BMW cars. The target criteria may be used to identify one or more content to send to the user device 105 during the session based on an identified persona segment 110 derived from the user interaction data of a session for a user account identifier 130

The targeting server 120 may transmit the target criteria to the content delivery server 125. The content delivery server 125 may use the target criteria to identify content corresponding to the identified dominant personas 110. In some embodiments, the content delivery server 125 may transmit the content to the user device 105.

In some embodiments, the persona segments 110 may be associated with unique identifiers (e.g., persona segment identifiers 134). In some embodiments, a determination may be made that a score corresponding to a persona segment satisfies a threshold. In some embodiments, a persona segment 110 may have a score ranging between 0.0 and 1.0. For example, a persona segment may have a score of 0.7. The threshold may be a minimum score necessary to store the persona segment 110. The threshold may be set to 0.5. Because the score of the persona segment 110 is higher than the threshold (e.g., 0.7 is greater than 0.5), a persona segment identifier 134 may be generated and assigned to the persona segment 110. The persona segment 110 may be stored with the persona segment identifier 134 in association with additional data, such as a user account identifier 130 and/or session identifier 132.

In some embodiments, previously generated persona segments 110 may be retrieved using the persona segment identifier 134 and compared to a recently generated persona segment 110 generated using a collection of keywords from different sessions of the user account. The newly generated persona segment 110 may be determined to be the same or nearly the same as a previously stored persona segment 110 but may have an updated set of semantic attributes 136. The previously generated persona segments 110 associated with a user account identifier 130 may be replaced using the recently generated persona segment 110.

In some embodiments, a collection of keywords for a product identifier of a new session may be identified but determined to be insufficient to provide to a machine learning algorithm to generate a persona segment 110. For example, the number of keywords for the product identifier may not satisfy a minimum threshold value to trigger the generation of a person segment 110. However, the collection of keywords may be used to obtain content relevant to the user of the session by comparing the collection of keywords to a previously generated persona segment for the user account identifier 130 of the session. If, for example, all the keywords in the set of keywords for the product identifier are the same as the keywords of a previously stored persona segment 110, the previously stored persona segment 110 may be used in connection with the new session to obtain content for the user.

Figure 1B:
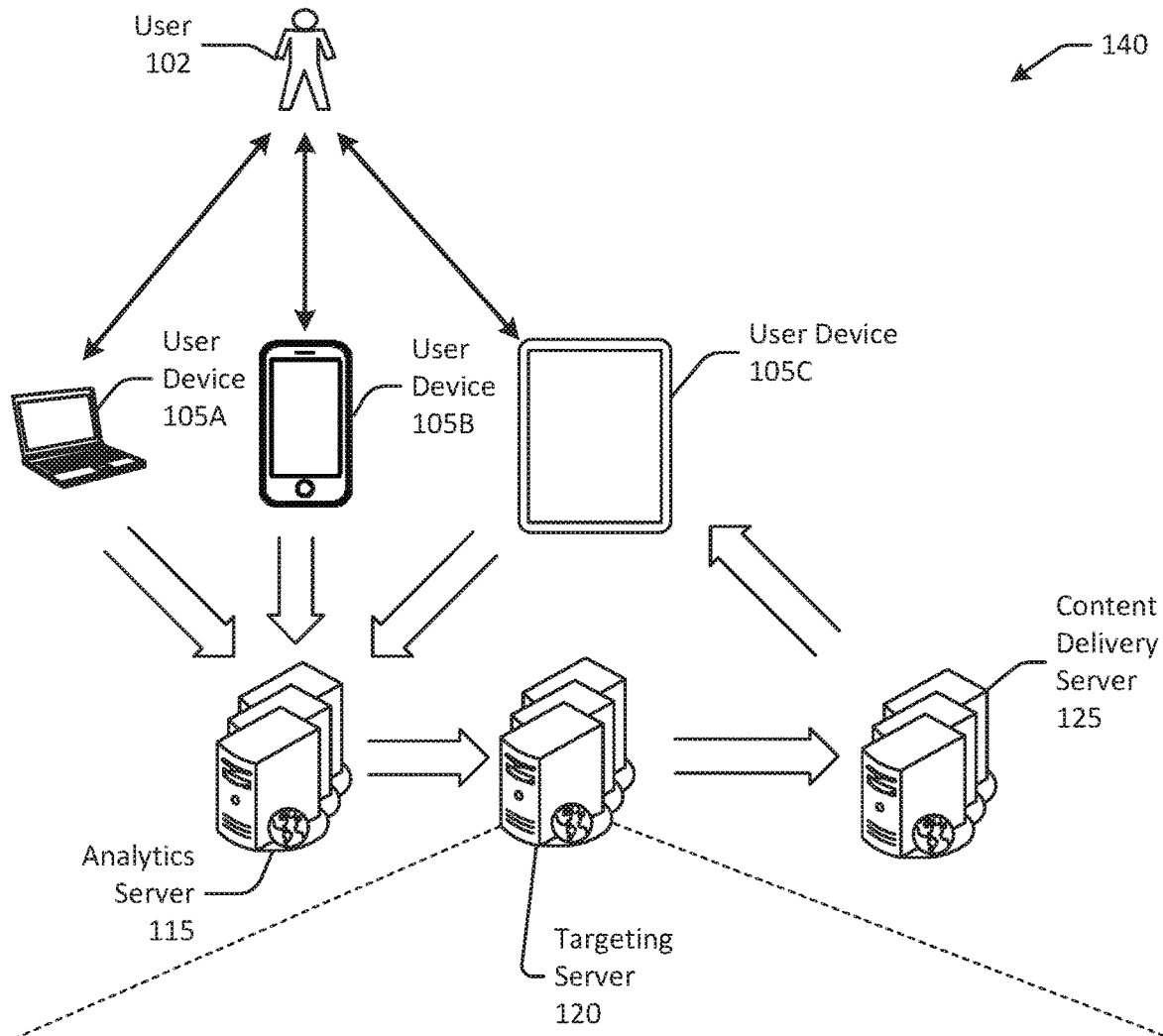
FIG. 1B is a data flow diagram for content delivery based on persona segments for a single user that uses multiple devices in accordance with one or more embodiments of the disclosure.

Now referring to FIG. 1B, a data flow diagram 140 for content delivery based on persona segments for a single user that uses multiple devices in accordance with one or more embodiments of the disclosure is depicted. As depicted in FIG. 1B, a single user 102 may use multiple user devices 105A, 105B, 105C. The user devices 105A, 105B, 105C may generate user interaction data associated with the user account of the user 102 during different sessions, where the different sessions may capture data from the different user devices 105A, 105B, 105C. The respective user devices 105A, 105B, 105C may transmit user interaction data to the analytics server 115 to be processed. Collections of keywords may be generated for each session (which may be from different user devices 105A, 105B, 105C) and identified by a respective session ID 132. In some embodiments, the analytics server 115 may generate metadata for the different collection of keywords. The metadata for the collection of keywords may include information from the user interaction data, such as the corresponding device identifier 138, session identifier 132, duration of the session, and the like. The metadata and the collection of keywords may be transmitted to the targeting server 120.

In some embodiments, the targeting server 120 may provide the collection of keywords as input to identify one or more personas for each session. As depicted in the table of FIG. 1B, in some embodiments, a statistical model may be used to identify one or more persona segments 110 for each user session. For example, the table depicts three sessions that identified two persona segments (e.g., PSID01, PSID02). As illustrated, persona segments that are identified for the user 102 while using user device 105A may also be identified for a session generated by the user 102 while using user device 105C. Upon identification of a persona segment 110, the content delivery server 125 may identify content that corresponds to the persona segment 110 and transmit the content to the appropriate user device 105C.

Figure 1C:
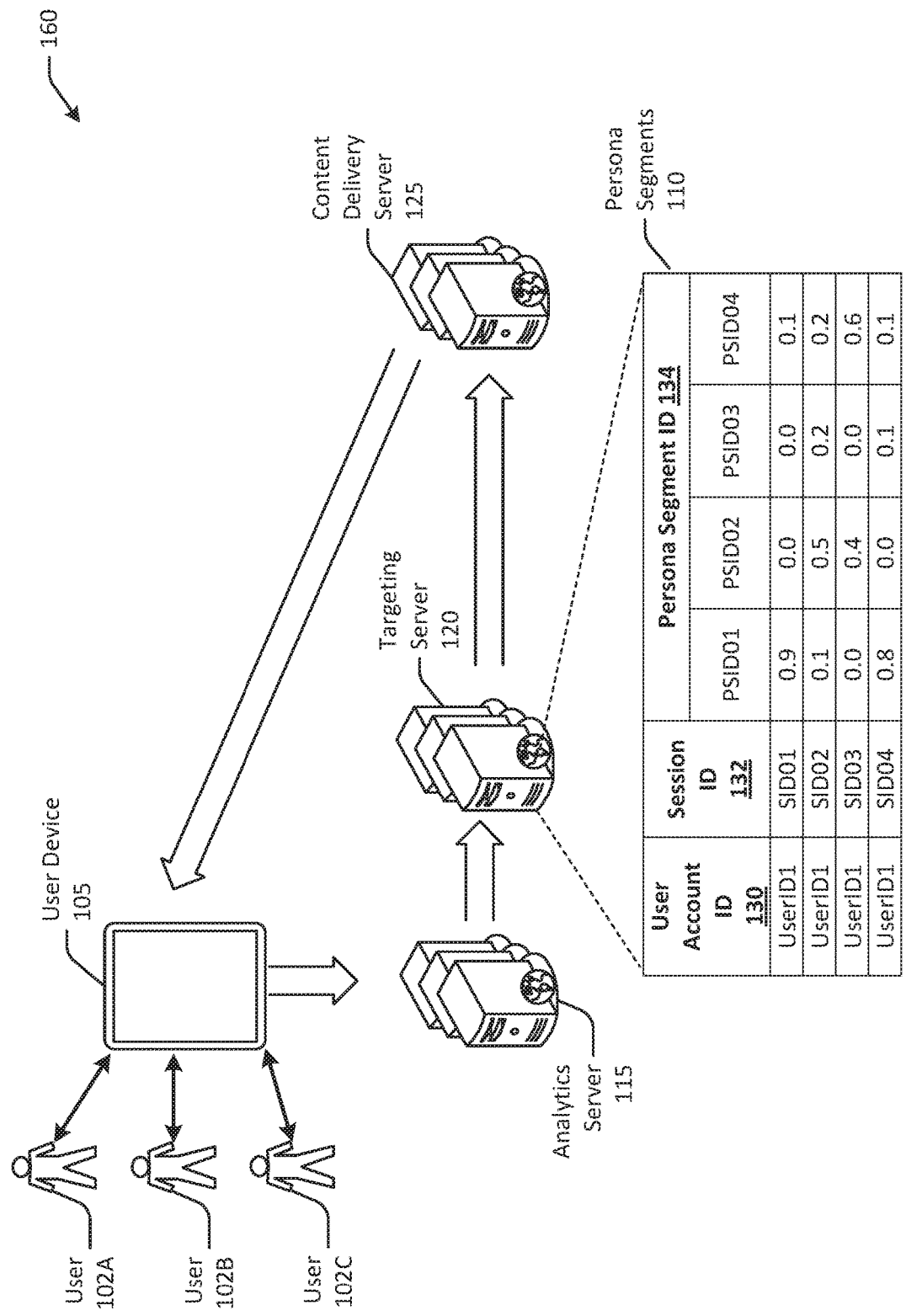
FIG. 1C is a data flow diagram for content delivery based on persona segments for multiple users in accordance with one or more embodiments of the disclosure.

Now referring to FIG. 1C, a data flow diagram 160 for content delivery based on persona segments for multiple users in accordance with one or more embodiments of the disclosure is depicted. As depicted in FIG. 1C, different users 102A, 102B, 102C (collectively or singularly referred to as 102) may share a user device 105. The user device 105 may generate user interaction data associated with a user account during different sessions, where the different sessions may indicate the actions of multiple users 102A, 102B, 102C. The user device 105 may transmit user interaction data to an analytics server 115. The analytics server 115 may process the user interaction data and may generate collections of keywords for each session, identified by a different session ID 132. In some embodiments, the data generated by the different users may include data generated during a single session or multiple sessions. The analytics server 115 may generate metadata for the different collection of keywords. The metadata for the collection of keywords may include information from the user interaction data, such as the corresponding session identifier, duration of the session, and the like. The metadata and the collection of keywords may be transmitted to the targeting server 120.

The targeting server 120 may receive the collections of keywords for the different sessions and may provide the collections of keywords as input to a machine learning algorithm for topic modeling to identify one or more persona segments 110 for each session. Based on the persona segments 110 generated for the different sessions, the targeting server 120 may determine if a user account is utilized by multiple users. For example, the table depicted in FIG. 1C shows four user sessions 132 (e.g., SID01, SID02, SID03, SID04), that are linked to the same user account ID 130 (e.g., UserID1). The targeting server 120 may generate scores indicating a confidence level of the different personas segments 110 for each of the different sessions. Based on the data show, session SID01 may have a dominant persona segment 110 of Persona PSID01, session SID02 has a dominant persona segment of PSID02, session SID03 has a dominant persona segment 110 of PSID04, and session SID04 has a dominant persona segment 110 of PSID01. Based on the dominant persona segments 110 identified, it appears that there are likely at least two or three users associated with user account ID 130 UserID1. Example processes for identifying a persona segment when there are numerous persona segments 110 associated with a user account such as a multiple user account are further discussed in relation to FIGS. 7A-7C.

In one example, based on a determination that multiple users are likely associated with a user account, the targeting server 120 may identify a dominant persona segment 110 for session SID01 and may generate target criteria based on PSID01. The processing of the user interaction data may be done in real time or near real time. As the user interactions are generated for each session, the user interaction data may be transmitted to the analytics server 115. By analyzing and processing the user interaction data as it is being generated, the systems and methods described herein may identify and deliver relevant content in the current sessions that are relevant to their respective users. The target criteria may be transmitted to the content delivery server 125 to identify content corresponding to the target criteria and thus relevant to the user of session SID01. The content delivery server 125 may identify content based on the target criteria and may transmit the content to the user device 105 associated with session SID01.

In some embodiments, user device 105 may transmit user interaction data from a session to the analytics server 115. In some embodiments, the analytics server 115 may determine that a persona segment 110 was previously generated for user account identifier 130 from a previous session. For example, the analytics server 115 may determine that there is insufficient user data interaction received from user device 105 in a current session, but may use a collection of keywords that have been generated from the current session to compare to persona segments 110 that correspond to the user account identifier 130 and were previously generated. If all the keywords in the collection of keywords match the semantic attributes of an existing persona segment 110, the analytics server 115 may determine that the persona segment 110 identified may be applied to the current session without generating new persona segments 110 until additional user interaction data is obtained for the current session.

The analytics server 115 may identify product identifiers and product descriptors from the user interaction data of the current session and keywords may be extracted for the session. In some embodiments, the analytics server 115 may provide the keywords to the targeting server 120 to identify one or more persona segments 110. In some embodiments, the targeting server 120 may determine to generate a new persona segment 110 based on the keywords of the current session. In some embodiments, the determination may be made in response to determining the collection of keywords for the session satisfies a minimum threshold value. In some embodiments, the semantic attributes 136 of a previously generated persona segment 110 may be updated using the collection of keywords from the current session. For example, a newly generated persona segment 110 may be compared to a previously generated persona segment 110. The comparison may determine that the semantic attributes 136 associated with the respective persona segments 110 may have a number of semantic attributes 136 in common by identifying the number of common semantic attributes 136 to a number of total semantic attributes 136 of the previously generated persona segment 110. If the determined percentage of common semantic attributes 136 satisfies a threshold, then the additional semantic attributes 136 of the newly generated persona segment 110 may be added to the semantic attributes 136 of the previously generated persona segment 110. In some embodiments, the semantic attributes 136 of the newly generated persona segment 110 may replace the semantic attributes 136 of the previously generated persona segment 110.

The identified persona segment 110 may be transmitted to the content delivery server 125 to identify content that corresponds to a dominant persona segment 110 of a user based on the user interaction data of the current session. In some embodiments, target criteria may be generated using the semantic attributes for the dominant persona segment 110. The target criteria may be used to identify content that match the target criteria and are more likely to be relevant to the current user of the current user session. The content delivery server 125 may facilitate transmission of the content to the user device 105 for presentation.

Figure 1D:
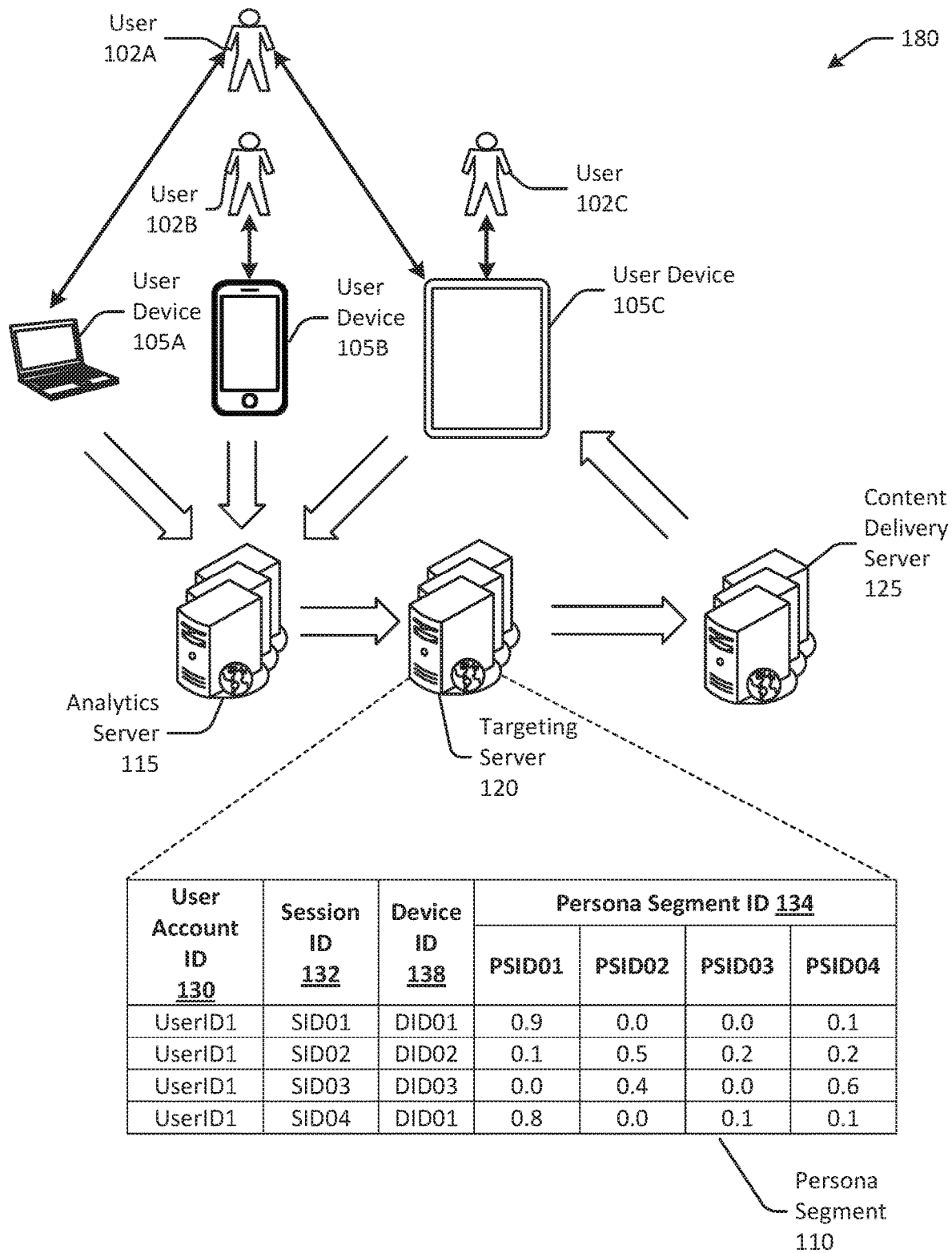
FIG. 1D is a data flow diagram for content delivery based on persona segments for multiple users of multiple devices in accordance with one or more embodiments of the disclosure.

Now referring to FIG. 1D, a data flow diagram 180 for content delivery based on persona segments for multiple users of multiple devices in accordance with one or more embodiments of the disclosure. As depicted in FIG. 1D, different users 102A, 102B, 102C may share multiple user devices 105A, 105B, 105C. For example, User 102A may interact with user device 105A and 105C, user 102B may primarily interact with user device 105B, and user 102C may interact primarily with user device 105C. The user devices 105A, 105B, 105C may generate user interaction data associated with the user account shared by the multiple users (e.g., 102A, 102B, 102C) during different sessions, where the different sessions may indicate the actions of multiple users 102A, 102B, 102C. The respective user devices 105A, 105B, 105C may transmit user interaction data to the analytics server 115 to be processed. Collections of keywords may be generated for each session, identified by a different session ID 132. In some embodiments, the data generated by the different users 102A, 102B, 102C may include data generated during a single session or multiple sessions. The analytics server 115 may generate metadata for the different collection of keywords. The metadata for the collection of keywords may include information from the user interaction data, such as the corresponding device identifier 138, session identifier 132, duration of the session, and the like. The metadata and the collection of keywords may be transmitted to the targeting server 120.

The targeting server 120 may provide the collection of keywords as input to identify one or more personas for each session. As depicted in the table of FIG. 1D, in some embodiments, a statistical model may be used to identify one or more persona segments 110 for each user session. For example, the table depicts four persona segments (e.g., PSID01, PSID02, PSID03, PSID04) and a numeric value that represents a likelihood that the persona segment 110 is the correct persona segment for the session. The table indicates that for user account UserID1, session ID SID01, device ID DID01, it is 90% likely that PSID01 is the correct persona segment 110, whereas for UserID1, SID02, DID02, it is 50% likely that PSID02 is the correct persona segment 110. In some embodiments, the persona segment identifier 134 with the highest score among the persona segments 110 associated with the user account ID 130, session ID 132, and/or device ID 138 is likely the correct persona segment for that session. In some embodiments, the system may determine that a user (e.g., 102B) interacts primarily with a single user device (e.g., 105B) and may determine that user interaction data received from the user device 105B is likely for a specific user 102B.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
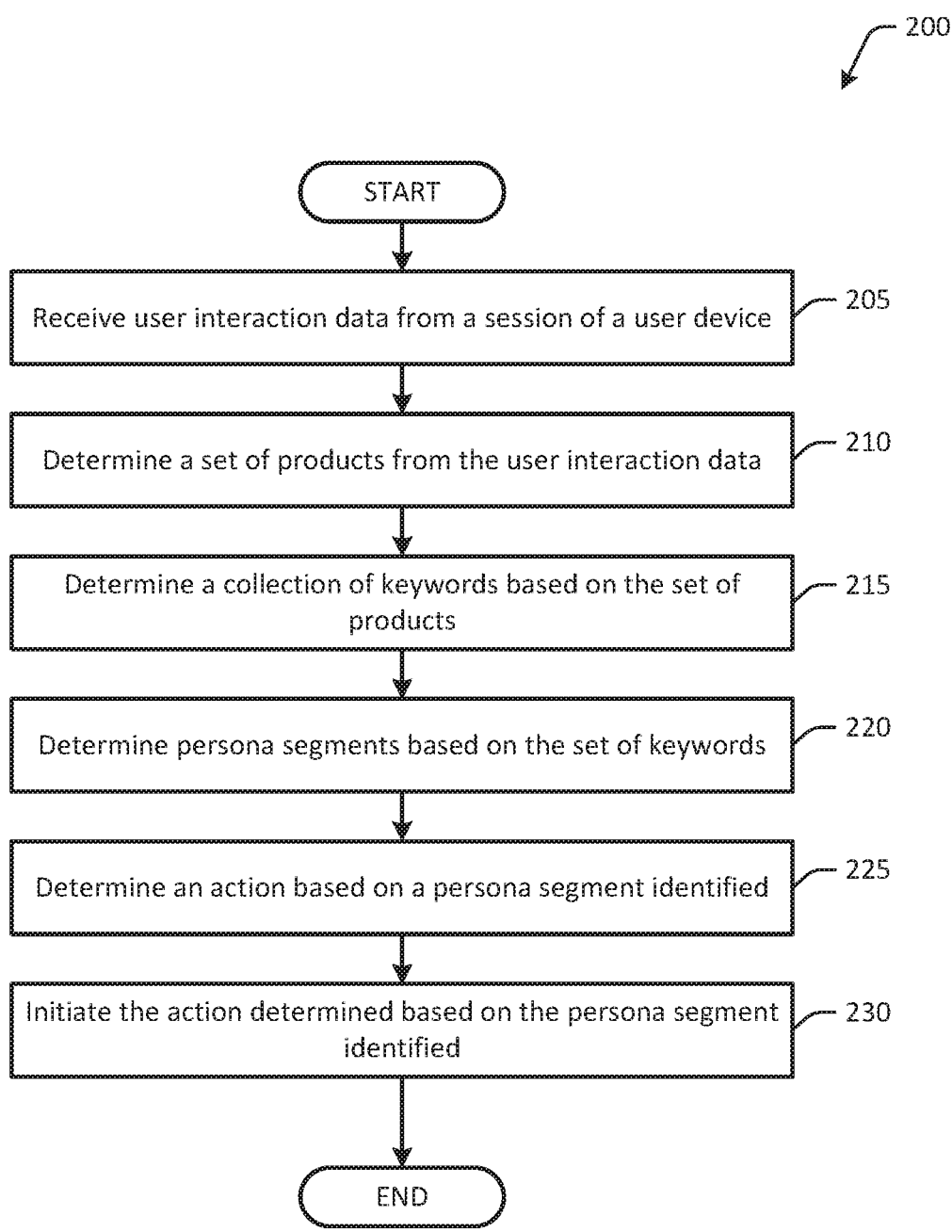
FIG. 2 is an example process flow diagram for content delivery based on persona segments in accordance with one or more embodiments of the disclosure.

FIG. 2 is an example process flow diagram 200 for persona identification based on user interaction data during a user session in accordance with one or more embodiments of the disclosure. At block 205, an analytics server 115 may receive user interaction data from a session of a user device 105. Examples of user interaction data may include, but is not limited to, data indicative of purchase activity of a user, searching activity (e.g., search queries, web surfing, etc.), selection activity of content items, viewing activity content items (e.g., for a threshold length of time, reading reviews associated with content, etc.), interacting with media assets (e.g., watching a movie, listening to music, listening to a podcast, etc.), or creating content (e.g., writing a review for a product, writing a story, editing or creating a media asset, etc.). The data may include product identifiers, product categories, content identifiers, content categories, and the like. In some embodiments, user interaction data may be in the form of clickstream (also known as clickpath) or voicestream data. Clickstream may be a record of user activity in an online environment. Voicestream data may be a record of verbal user activity, such as, for example, in connection with a smart speaker.

At block 210, a set of products from the user interaction data may be determined or identified. In some embodiments, the analytics server 115 may identify products and associated product identifiers from the user interaction data. For example, the analytics server 115 may process the user interaction data and identify ASINs, ISBNs, UPCs, and other product identifiers as well as names of products (e.g., spoons, cutting boards, knives, books, movie titles, etc.).

At block 215, the analytics server 115 may determine a collection of keywords based on the set of products from block 210. In some embodiments, the analytics server 115 may use the product identifiers to obtain data associated with the product, such as product descriptors or keywords associated with the product identifiers. The analytics server 115 may obtain product data using the product name or product identifier. In some embodiments, the analytics server 115 may use the product identifier to obtain product data from a product catalog or product category browse node tree. In some embodiments, the product data may be a product description, a product status, a substitute product, a product complementary to the product, or the like). The analytics server 115 may identify descriptive terms from the product data. The analytics server 115 may determine the collection of keywords by processing the obtained product data associated with the product or product identifiers and aggregating the descriptive terms from the product data. In some embodiments, the collection of keywords may include a set of keywords that occurs a number of times in the product data and the number of times is above a predetermined threshold. In some embodiments, the collection of keywords is determined by identifying the most frequently occurring words or phrases in the product data associated with the product name or product identifier. The collection of keywords may be transmitted from the analytics server 115 to a targeting server 120.

At block 220, persona segments 110 may be determined based on the collection of keywords. The collection of keywords may be received by the targeting server 120. The collection of keywords may be used to determine one or more persona segments 110 associated with a session identifier 132. In some embodiments, the one or more persona segments 110 may include a collection of semantic attributes (e.g., keywords) that are indicative of a persona or a set of behavioral characteristics or traits of a user. The determination of persona segments 110 are discussed further, in an example embodiment, with relation to FIG. 6.

In some embodiments, a dominant persona segment 110 of a session may be selected or identified from a set of persona segments 110 of a session. For example, a score may be generated for each of the persona segments 110 identified by the machine learning algorithm. The respective score of each of the persona segments 110 may be ranked and the persona segment 110 that corresponds to the highest score may be selected as the dominant persona segment 110 of the session. In some embodiments, multiple dominant persona segments 110 may be determined by comparing the scores of the persona segments 110 and those that satisfy a threshold (e.g., higher than a minimum value for a dominant persona segment 110) may be selected as dominant persona segments 110 for the session. In some embodiments, if there are multiple dominant persona segments 110, a determination may be made to see if multiple users share a user account.

In some embodiments, the targeting server 120 may identify the dominant persona segment 110 of a session and may generate target criteria using the dominant persona segment 110. The target criteria may be transmitted to the content delivery server 125. Additional information may be transmitted to the content delivery server 125, such as the persona segment 110, user account identifier 130 corresponding to the persona segment 110, and the like. The persona segments 110 may include a persona segment identifier 134 and one or more semantic attributes 136 associated with the persona segment 110.

At block 225, an action may be determined based on the persona segments 110 identified. In some embodiments, the action may be to identify and deliver content based on the persona segment 110 identified. The content delivery server 125 may receive a selected or identified dominant persona segment 110 and/or target criteria generated using semantic attributes 136 of an identified dominant persona segment. The target criteria may be used to identify and retrieve content by the content delivery server 125. The content delivery server 125 may transmit content to the user device 105 associated with the user account corresponding to the persona segment 110 identified. Other examples of actions may include, but are not limited to, providing special privileges or access to one or more users 102 associated with a user account identifier 130, providing special promotions, providing recommendations for a product or service, providing a customized incentive, ranking marketing techniques based on the persona segments 110, providing access to limited or special content, customizing trivia questions, providing membership program incentives, providing customized guidance, and/or the like. In some embodiments, multiple actions may be identified based on the persona segment 110. For example, customized content as well as customized incentives may be identified based on the persona segment 110.

At block 230, the action determined based on the one or more persona segments 110 identified may be initiated. For example, if the action is to provide content delivery and content has been identified based on the persona segment 110 identified, the content delivery server 125 may transmit the identified content to the user device 105 corresponding to the user account identifier 130 of the persona segment 110 identified for presentation during the session. In some embodiments, the system may initiate the multiple actions determined at block 230. In some embodiments, the actions may be initiated simultaneously or near simultaneously. In some embodiments, the actions may be initiated based on specified time periods or triggering actions (e.g., user 102 signs up for a membership using a user account identifier 130 and a specific incentive may be provided).

Figure 3:
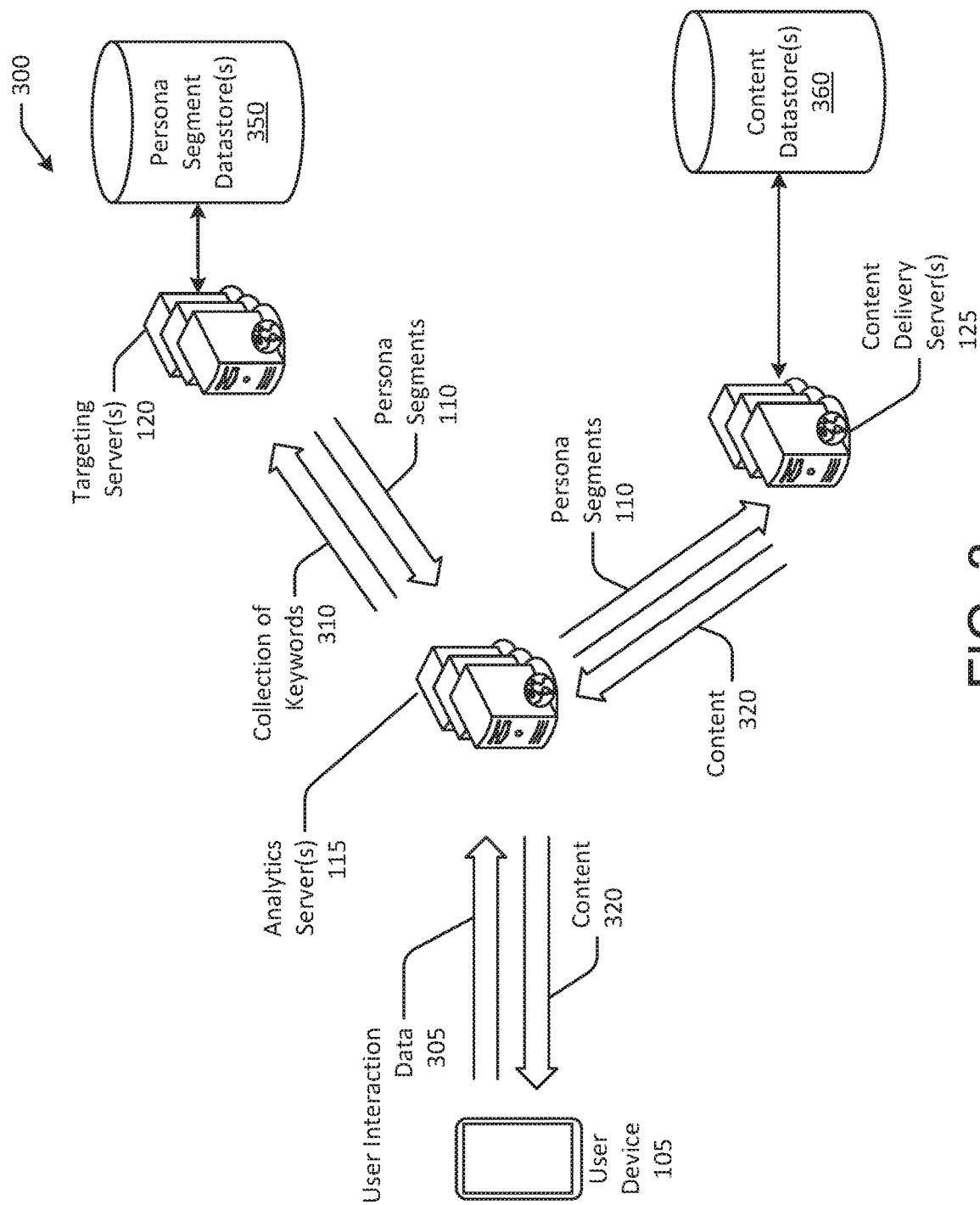
FIG. 3 is a schematic hybrid system/data flow diagram depicting various illustrative data communications between components of the system architecture depicted in FIG. 1 as part of a process for content delivery based on persona segments in accordance with one or more example embodiments of the disclosure.

Now referring to FIG. 3, a schematic hybrid system/data flow diagram 300 depicts various illustrative data communications between components of the system architecture depicted in FIGS. 1A-1D as part of a process for content delivery based on persona segments 110 in accordance with one or more example embodiments of the disclosure. A user device 105 may generate user interaction data 305 (e.g., logs, clickstream data, voicestream data, etc.) and transmit the user interaction data 305 to an analytics server 115. In some embodiments, the user interaction data 305 may be transmitted, for example, in batches, at the end of a session, or at predetermined time intervals. In some embodiments, the user interaction data 305 may be transmitted in real-time or near real-time. In some embodiments, the user interaction data 305 may be transmitted in a message to the analytics server 115.

The analytics server 115 may receive the user interaction data 305. The analytics server 115 may process the user interaction data 305 to identify a set of product identifiers. For example, the product names or product identifiers may be identified by applying natural language processing to the user interaction data 305. Product names may be used to obtain product identifiers from a product database or other similar data structure, such as a browse node tree. For example, the analytics server 115 may determine, from the user interaction data 305, that a user submitted a search query for a specific product (e.g., specific branch of dog food). The analytics server 115 may obtain the product name of the dog food from the search query. The search query may have been captured in the user interaction data 305. The analytics server 115 may use the product name to look up the product identifier in a product catalog, product database, product browse node tree, or other product category organization. The analytics server 115 may use the product identifier to obtain product descriptors. For example, product descriptors may have been generated during the data preparation phase of the persona modeling and may have been stored in a datastore in association with the product identifier, as further described in FIG. 5. A product descriptor may be a set of keywords or descriptive terms that are associated with a product or content and describe or are indicative of an attribute of the product or content. The product descriptor may be generated from browse-node tree hierarchy data, product details description, and other product data. The analytics server 115 may aggregate the product descriptors for each product or content identified from user interaction data of a session and generate a collection of keywords 310. The keywords 310 may be transmitted to a targeting server 120. The targeting server 120 may receive the collection keywords and provide them as input to a generative statistical model used for topic modeling to generate or identify persona segments 110 based on the collection of keywords. Examples of algorithms used for topic modeling may include, but are not limited to Latent Dirichlet allocation, non-negative matrix factorization, explicit semantic analysis, latent semantic analysis, Hierarchical Dirichlet process, and the like. Topic modeling in machine learning or natural language processing is a type of statistical model for discovering abstract topics that occur in a data set.

In some embodiments, the generative statistical model may generate and/or identify one or more persona segments 110. The process for identifying persona segments 110 is further discussed, in an example embodiment, in relation to FIG. 6. In some embodiments, the persona segments 110 may be retrieved and/or stored in a persona segment datastore 350. In some embodiments, persona segments 110 may be sent from the targeting server 120 to the analytics server 115. The analytics server 115 may receive the persona segments 110 for the user account. The analytics server 115 may generate a respective score for each of the persona segments 110. In some embodiments, the score may be a confidence score indicative of a likelihood that the persona segment 110 is the correct or dominant persona segment 110 of the user session. The analytics server 115 may rank the persona segments 110 based on their respective scores and may select a dominant persona segment 110. The analytics server 115 may generate target criteria based on the dominant persona segment 110 using the semantic attributes 136 of the dominant persona segment 110. The analytics server 115 may transmit a request for content that includes the selected persona segment 110 and/or the target criteria based on the selected persona segment 110 to a content delivery server 125.

The content deliver server 125 may receive the request and may use the persona segment 110 and/or corresponding target criteria to identify content 320 based on the semantic attributes 136 of the persona segment 110. For example, target criteria may be generated based on one or more semantic attributes of the persona segment 110. The target criteria may be applied to content to identify content that is relevant to the persona segment 110. The content delivery server 125 may retrieve content from a content datastore 360. In some embodiments, the content delivery server 125 may generate a response that includes the identified content 320 and transmit the content to the analytics server 115. The analytics server 115 may receive the content and may transmit the content to the user device 105 for presentation to the user.

In some embodiments, the targeting server 120 may generate the scores for each persona segment 110, select a dominant persona segment 110, and generate target criteria corresponding to the dominant persona segment 110. The dominant persona segment 110 may be the persona segment 110 that is the most likely to be indicative of a current mindset of user during a session. The targeting server 120 may transmit the selected persona segment 110 and/or target criteria to a content delivery server 125. The content delivery server 125 may identify content based on the selected persona segment 110 and/or target criteria and may transmit the content 320 directly to the user device 105. Although the description is in the context of content delivery, as discussed in relation to FIG. 2, content delivery is one example of an action that may be determined based on the one or more persona segments 110 identified for a session. The analytics server 115 may communicate with multiple servers to initiate, launch, and/or facilitate one or more actions determined based on the one or more persona segments 110.

Figure 4A:
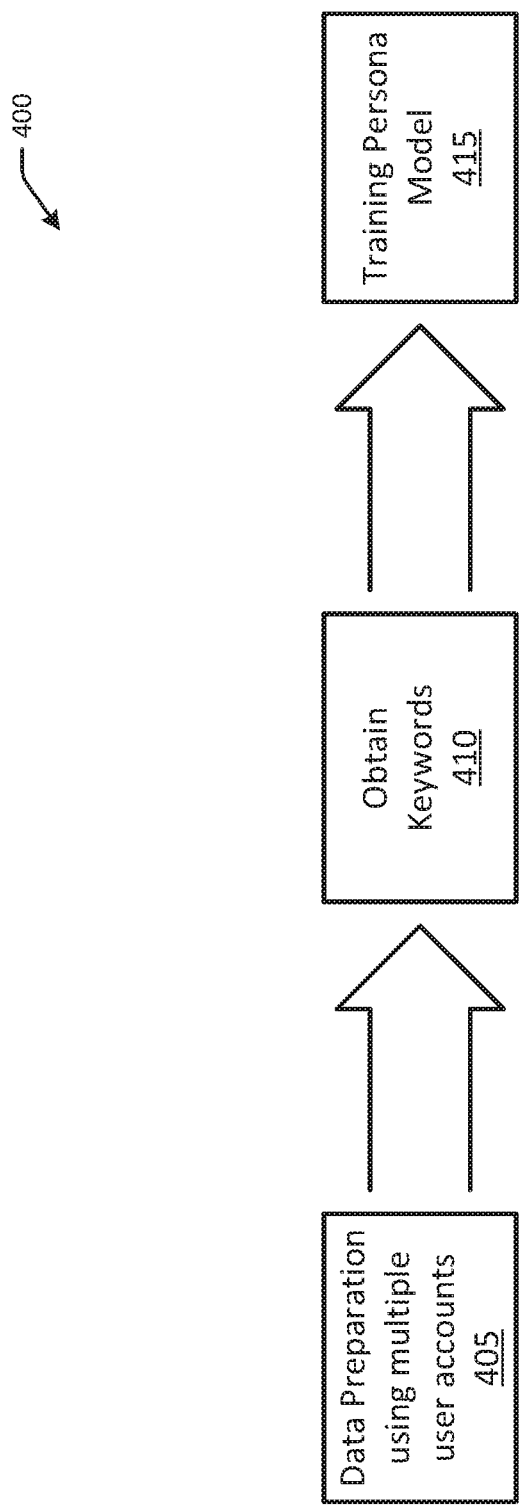
FIG. 4A is an example diagram depicting a data flow for different stages of training a persona model in accordance with one or more embodiments of the disclosure.

Now referring to FIG. 4A, an example diagram of a data flow 400 for different stages of training a persona segment model in accordance with one or more embodiments of the disclosure is depicted. FIG. 4A is an example data flow depicting the training process for a persona segment model. In some embodiments, data obtained for multiple user accounts are used to prepare a dataset containing a collection of keywords using product metadata to train the persona model, which enables the model to learn a set of persona segments for a population of user accounts and store them with corresponding persona segment identifiers 134 (e.g., PSID01, PSID02, etc.).

At stage 405, data preparation using multiple user account identifiers 130 may be directed for product identifier data preparation. In some embodiments, user interaction data 305 associated with multiple user device identifiers 136, session identifiers 132, and user account identifiers 130 may be collected. Additionally information, such as product description, name of the product, browser hierarchy information, browse node tree hierarchy, and the like may be obtained. In some embodiments, additional metadata for the user interaction data 305 may be generated. In some embodiments, based on one or more rules, metadata may be generated and associated with product identifiers. For example, a product identifier may be associated with a reduced product price. The one or more rules may be applied and it may be determined that the reduced product price satisfies a predetermined threshold (e.g., the reduced product price is 50% off of the original price of the product). The metadata may be generated and associated with the product identifier, where the term "deal-seeker" may be associated with the product identifier based on the one or more rules. The user interaction data 305 and the additional information that was obtained and/or generated (e.g., metadata) may be used to map product identifiers (e.g., obtained from the user interaction data, from a product catalog, etc.) to a set of descriptors to generate product descriptors. A product descriptor may be a set of keywords associated with the product identifier. Data preparation is further discussed in relation to FIG. 5.

At stage 410, a collection of keywords 310 may be generated from user interaction data 305 corresponding to a session identifier 132, as described herein. In some embodiments, the collection of keywords 310 may be obtained by identifying a product identifier or product from the user interaction data 305 and obtaining the corresponding descriptor data that was generated at stage 405. At stage 410, the collection of keywords 310 may be used to train the persona model (e.g., a generative statistical model used for topic modeling). In some embodiments, the persona model may be used to generate one or more persona segments 110 using the collection of keywords 310. The generated persona segments 110 may include semantic attributes 136 derived from the collection of keywords 310 provided to the persona model. In some embodiments, persona segments 110 may be generated using additional information, such as geographic information or temporal information. For example, persona segments 110 may differ for different regions of the world. The qualities of a deal-seeker may be different for a user 102 that resides in Southeast United States and a user 102 that resides in London, England. Additionally, temporal information may also influence persona segments 110. Users 102 may exhibit more deal-seeking characteristics during the holiday season or may exhibit more gardening type characteristics during the spring season. By continuously adjusting and reevaluating persona segments 110 through periodic and/or continuous training of the persona model, accurate persona segments 110 may be generated and maintained. Additionally, the persona model may generate or identify multiple persona segments 110 based on the input provided. In some embodiments, to increase accuracy but to streamline the system, only the top ranked or more prevalent persona segments 110 may be stored. For example, the persona model may generate hundreds of persona segments 110. However, it may be determined that a third of the persona segments 110 only apply in less than ten percent of the population of users 102 of the system. In some embodiments, the third of the persona segments 110 that is not as relevant to the identified population of users 102 (e.g., based on one or more rules), may be discarded and the remaining persona segments 110 may be stored and applied, as described in FIG. 4B.

Figure 4B:
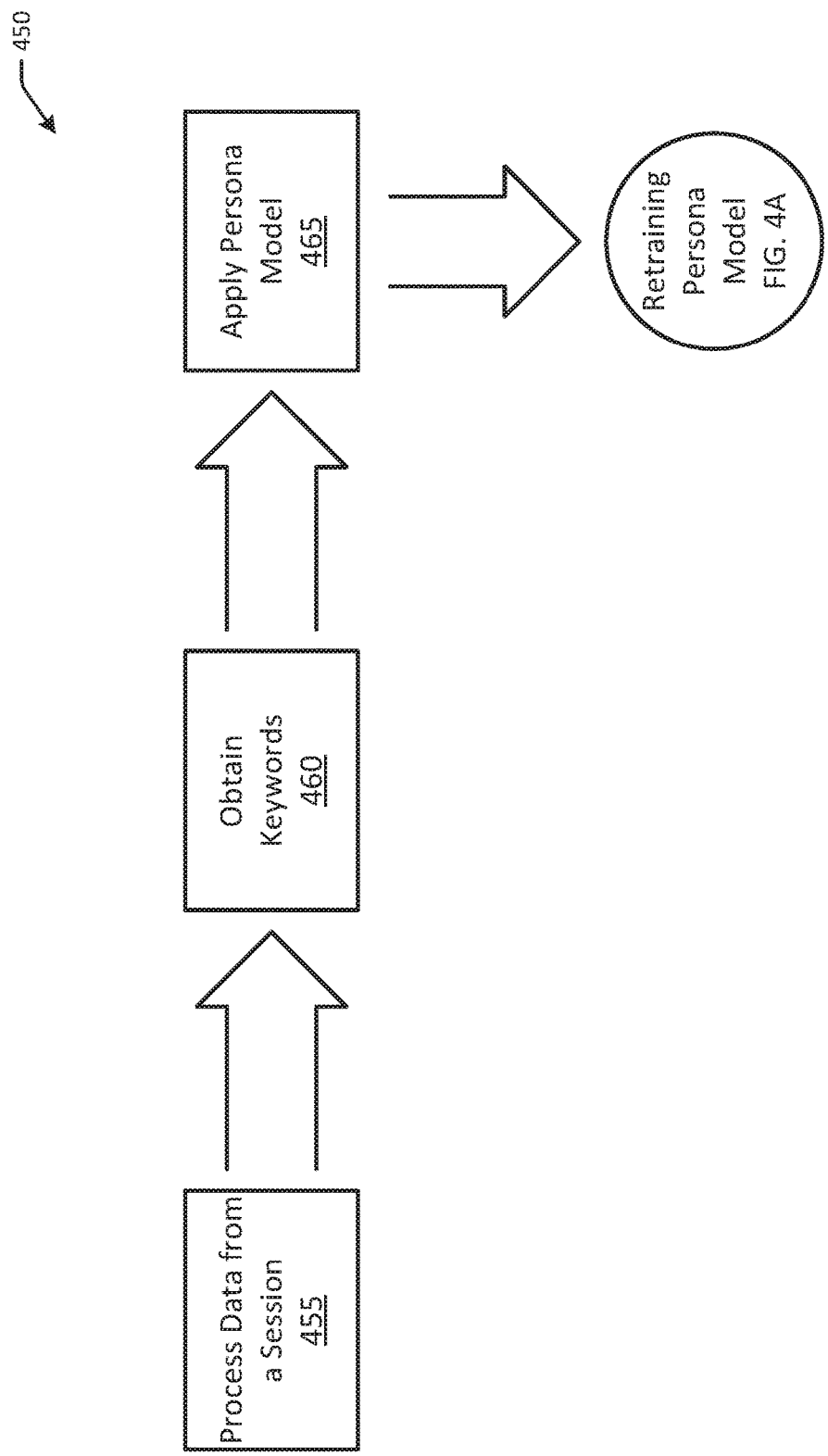
FIG. 4B is an example diagram depicting a data flow for using a persona model in accordance with one or more embodiments of the disclosure.

FIG. 4B is an example diagram depicting a data flow 450 for using a persona model in accordance with one or more embodiments of the disclosure. FIG. 4B is an exemplary data flow diagram depicting the usage and/or scoring process of the persona model trained in FIG. 4A.

In one example, a user 102 may interact with a retail website. The user 102 may interact with a user device 105, generating data. The data may be analyzed to identify products and/or product identifiers, which may be used to obtain collections of keywords for the products or product identifiers. The collection of keywords may be used as input for the trained persona model (e.g., trained in FIG. 4A). The persona model may determine or otherwise identify one or more dominant persona(s) segments 110 of the user 102 in a given session. Thus, the dominant persona segment(s) 110 identified by the persona model may be used to determine the content to be served to user device 105.

At stage 455, an analytics server 115 may receive user interaction data 305 from one or more user devices 105. The analytics server 115 may process the user interaction data associated with a session identifier 132. In some embodiments, the analytics server may identify one or more products or services from the user interaction data 305. At stage 460, the analytics server 115 may obtain a collection of keywords 310 from the processed user interaction data 305 from stage 455. The collection of keywords 310 may be obtained by retrieving a set of product descriptors for the identified products or services. The analytics server 115 may generate or otherwise determine a collection of keywords 310 by concatenating the keywords of the product descriptors for the identified products or services. At stage 465, the persona model trained in FIG. 4A may be used to identify one or more persona segments 110 for the session. In some embodiments, the collection of keywords from stage 460 may be provided to the persona model as input at stage 465. The personal model may identify one or more relevant persona segments 110 based on the collection of keywords and may generate a score to associate with each of the persona segments 110. The score may be indicative of a likelihood that the respective persona segment 110 is the dominant or correct persona segment 110 for the session. In some embodiments, the persona model may generate or identify data that may be used to further train the persona model. The data may be transmitted back to FIG. 4A, which enables the persona model to be retrained, thus enabling dynamic and continuous updates to the persona model to ensure the persona model identifies the evolving trends in personas displayed by users 102.

Figure 5:
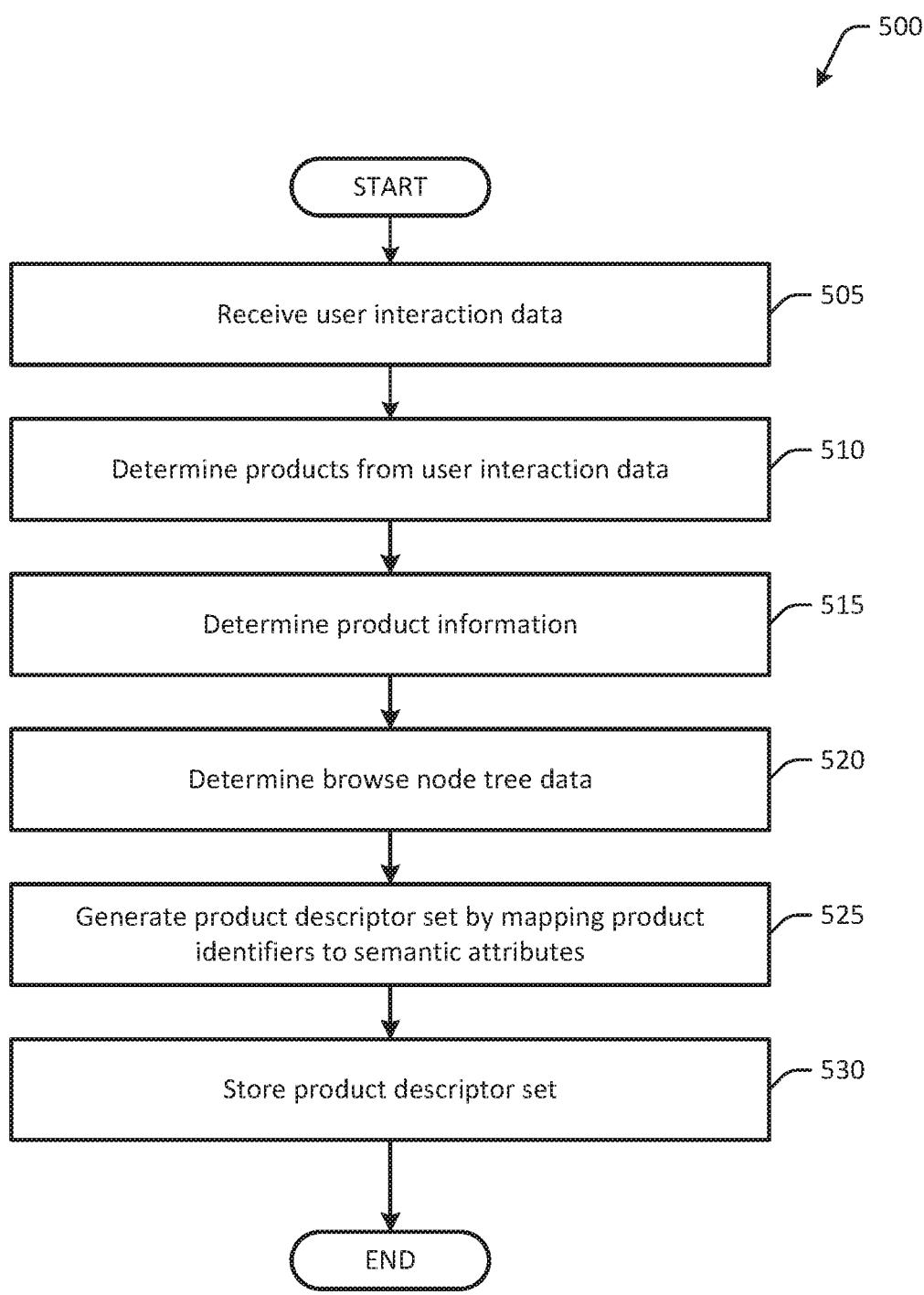
FIG. 5 is an example process flow diagram for data preparation for content delivery based on persona segments in accordance with one or more embodiments of the disclosure.

FIG. 5 is an example process flow diagram 500 for data preparation for persona identification based on user interaction data 305 in accordance with one or more embodiments of the disclosure. At block 505, user interaction data 305 associated with multiple sessions may be received. In some embodiments, the user interaction 305 may span multiple sessions, multiple user devices 105, and multiple users. In some embodiments, the user interaction data 305 may be received from a predetermined window of time (e.g., three months, one year, etc.).

At block 510, products (e.g., product name) and/or product identifiers may be determined from the user interaction data 305. In some embodiments, the user interaction data 305 may be processed to identify products or product identifiers. In some embodiments, the user interaction data 305 may be processed and then provided as input to a natural language processing algorithm to identify products or product identifiers.

At block 515, the product identifiers or product names may be used to determine product information. For example, a list of product names and/or product identifiers may be generated or determined from the user interaction data. A product name may be used to find a corresponding product identifier. The product identifier may be used to retrieve information from one or more sources, which may include, but are not limited to, a product catalog, product database, product browse node tree, or other organizational structure that maintains product data. Product information may include the brand of a product, product description, product category, product status (e.g., available, discontinued, out of stock, etc.), merchants, geographic location, or the like.

At block 520, browse node tree data may be determined. In some embodiments, the product identifiers and/or product information may be used to obtain information associated with the product in a product browse node tree. A product browse node tree may be a hierarchy of nodes used to organize products and relationships of products to other products and organization by category.

At block 525, generate product descriptor set by mapping product identifiers to semantic attributes. In some embodiments, the product descriptors are a unique set of keywords that are associated with a product identifier. The different information obtained, such as user interaction data 305, product identifier, product information, browse node tree data, and the like may be mapped to semantic attributes of the product identifier and used to determine persona segments 110. Different information may be mapped based at least in part on the identifying product identifier. For example, the product may be a dumbbell. The dumbbell may have a product identifier "ABC123." Additional sources of information of the product may include a product description (e.g., "CAP Barbell Rubber Coated Hex Dumbbell with Contoured Chrome Handle, Single"), a product catalog hierarchy (e.g., "Sports/Fitness/Training/Equipment"), and/or data from product review pages (e.g., "The dumbbell is sturdy as it should be, the contoured grip fits nicely into my palm and the texture is sufficient enough to maintain a non-slick grip. My wife states that the texture is too rough, that is debatable. The dumbbell has a slight odor to it, a rubber/chemical smell which is not overpowering and I'm sure will wear off over time."). An example mapping may be as follows: <product ID><Keywords>, which would be indicated as <ABC123><sporting-goods sports fitness strength training dumbbell exercise CAP Barbell contoured chrome sturdy non-slip>. An example first step of the process may be to run a join command based on the product identifier and then use natural language processing techniques to extract semantic attributes from the different sources associated with the product identifier. At block 530, the product descriptor sets are stored. In some embodiments, a unique identifier may be associated with each product descriptor set. The unique identifier may be used to retrieve or update a product descriptor set associated with a product identifier.

Figure 6:
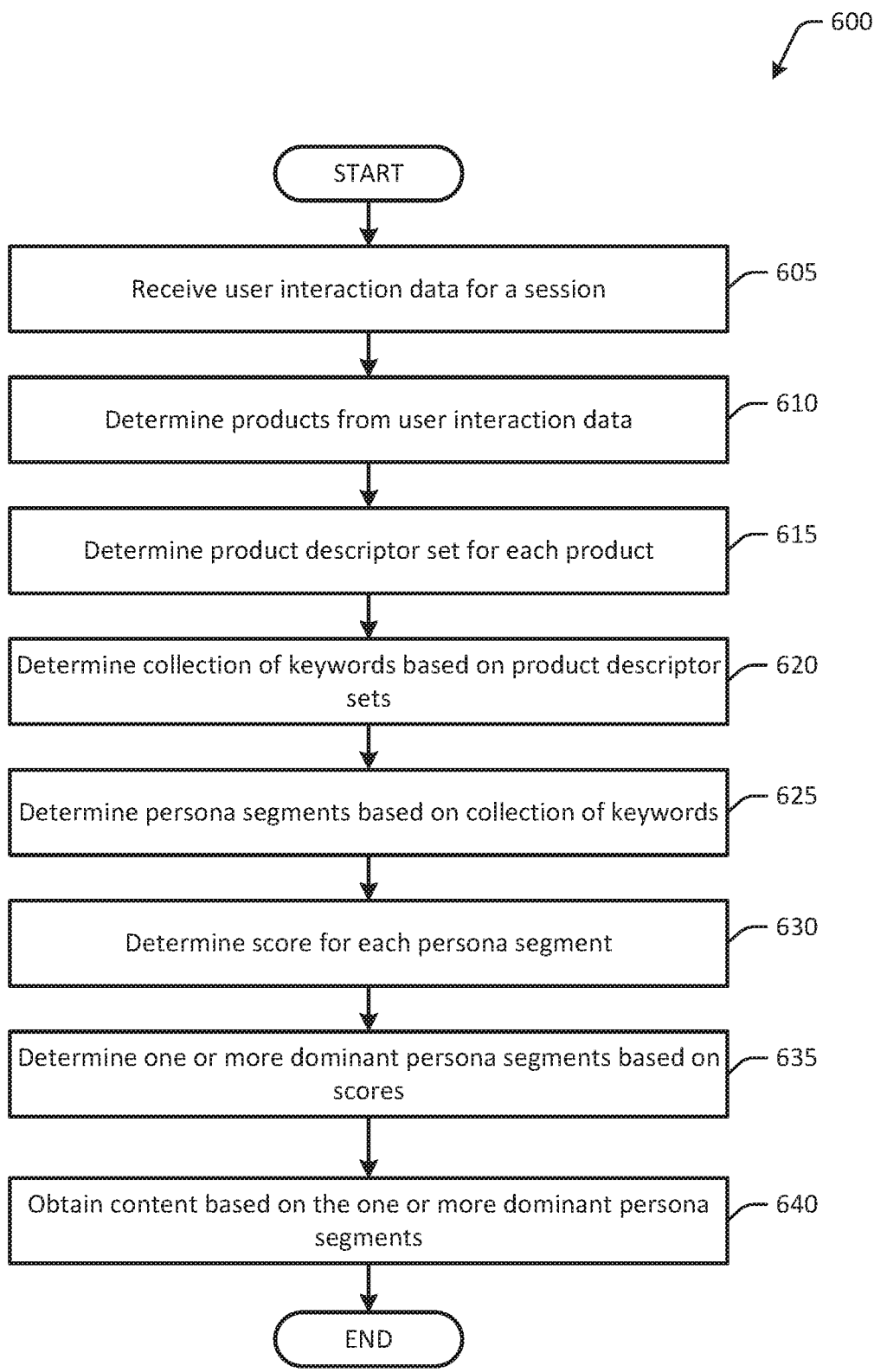
FIG. 6 is an example process flow diagram for content delivery based on persona segments in accordance with one or more embodiments of the disclosure.

FIG. 6 is an example process flow diagram 600 for persona segment identification for persona identification based on user interaction data 305 in accordance with one or more embodiments of the disclosure. At block 605, the analytics server 115 may receive user interaction data 305 for a session from a user device 105. In some embodiments, the user interaction data 305 may be clickstream data or voicestream data. In some embodiments, the user interaction data 305 may be aggregated log files from a user device 105.

At block 610, the user interaction data 305 is processed to determine product identifiers. In some embodiments, natural language processing algorithms may be applied to the user interaction data 305 to identify product names and/or product identifiers. The product names may be used to obtain corresponding product identifiers. In some embodiments, the product identifiers may be obtained from a product catalog, browse node tree, or other similar data structure used to organize product data. At block 615, a product descriptor set may be determined for each product identifier. A product descriptor set may be obtained from a datastore or a remote server. The product descriptor set may have been generated in a process such as described with regards to FIG. 5.

At block 620, a collection of keywords 310 may be determined based on the product descriptor sets. In some embodiments, keywords of each product descriptor set may be aggregated to generate the collection of keywords 310.

At block 625, persona segments 110 may be determined based on the collection of keywords 310. In some embodiments, the collection of keywords 310 may be provided as input to a generative statistical model used for topic modeling. Examples of algorithms used for topic modeling may include, but are not limited to Latent Dirichlet allocation, non-negative matrix factorization, explicit semantic analysis, latent semantic analysis, Hierarchical Dirichlet process, and the like. Topic modeling in machine learning or natural language processing is a type of statistical model for discovering abstract topics that occur in a data set. One or more persona segments 110 may be determined by applying the generative statistical model to the collection of keywords 310. In some embodiments, the generative statistical model may provide semantic attributes 136 that make up a persona segment 110.

At block 630, a score may be determined for each persona segment 110. In some embodiments, the score for each persona segment 110 may be indicative of a confidence level that the persona segment 110 corresponds to the collection of keywords 310 or how likely the collection of keywords 310 aligns with the semantic attributes of a persona segment 110. The score may be generated by comparing the number of keywords in the collection of keywords 310 in common with the semantic attributes 136 of the persona segment 110 to the total number of keywords in the collection of keywords 310. In some embodiments, an aggregated score may be generated for each persona segment over all sessions associated with a user account identifier 130. In some embodiments, the aggregated score may be generated for sessions associated with the user account identifier 130 for a specified time window or period of time (e.g., three month window, a specified date, range, etc.). In some embodiments, the aggregated score for each personal segment 110 may be a sum or average of the individual persona segment scores for the respective sessions. The aggregated score for each persona segment 110 may be used to identify dominant persona segments or as an inventory of persona segments associated with the user account identifier 130. At block 635, a dominant persona segment 110 may be determined. Based on the score for the different persona segments 110, the analytics server 115 or the targeting server 120 may determine one or more dominant persona segments 110. In some embodiments, a dominant persona segment 110 may be the persona segment 110 that corresponds to the highest score or the lowest score. In some embodiments, dominant persona segments 110 may be determined by comparing the scores corresponding to the persona segments 110 to a predetermined threshold and selecting all persona segments 110 that are above the predetermined threshold.

At block 640, the selected persona segment 110 may be used to obtain content. For example, the persona segment 110 (or persona segment identifier 134 or semantic attributes 136 of the persona segment 110) may be transmitted to the content delivery server 125. The content delivery server 125 may obtain the semantic attributes 136 associated with the persona segments 110 (e.g., retrieving the semantic attributes 136 using the persona segment identifier 134 or parsing the semantic attributes 136 from the received message) and using the semantic attributes 136 to identify content 320. The content 320 may be transmitted to the analytics server 115 and transmitted to the user device 105 for presentation.

In some embodiments, as the user continues to interact with a website to generate user interaction data, their mindset or persona may transition and a different dominant persona may emerge. For example, a user may initially use a session to research and purchase car parts. After the task is complete, and during the same session, the user may transition to another task. They may begin browsing new luggage for an upcoming trip. It would be important for the transition between dominant personas to be recognized so that relevant content may be displayed to the user.

In some embodiments, additional user interaction data from the session may be received. The analytics servers 115 may receive the additional user interaction data. The analytics server 115 may determine a second set of product identifiers and may obtain corresponding product descriptors for each of the product identifiers of the second set of product identifiers. The analytics server 115 may aggregate the descriptive terms from the product descriptors to generate a collection of keywords corresponding to the second set of product identifiers. The second collection of keywords 310 may be provided as input to the generative statistical model used for topic modeling. One or more persona segments 110 may be determined by applying the generative statistical model to the second collection of keywords 310. In some embodiments, the generative statistical model may provide semantic attributes 136 that make up a persona segment 110. The second set of persona segments corresponding to the second collection of keywords 310 may be processed to generate scores for each of the persona segments 110. Based on the scores, a dominant persona segment 110 may be identified from the set of persona segments 110. Target criteria may be generated based on the second dominant persona segment 110. The target criteria may be used to identify a second content. The second content may be transmitted to the user device 105 for presentation.

Figure 7A:
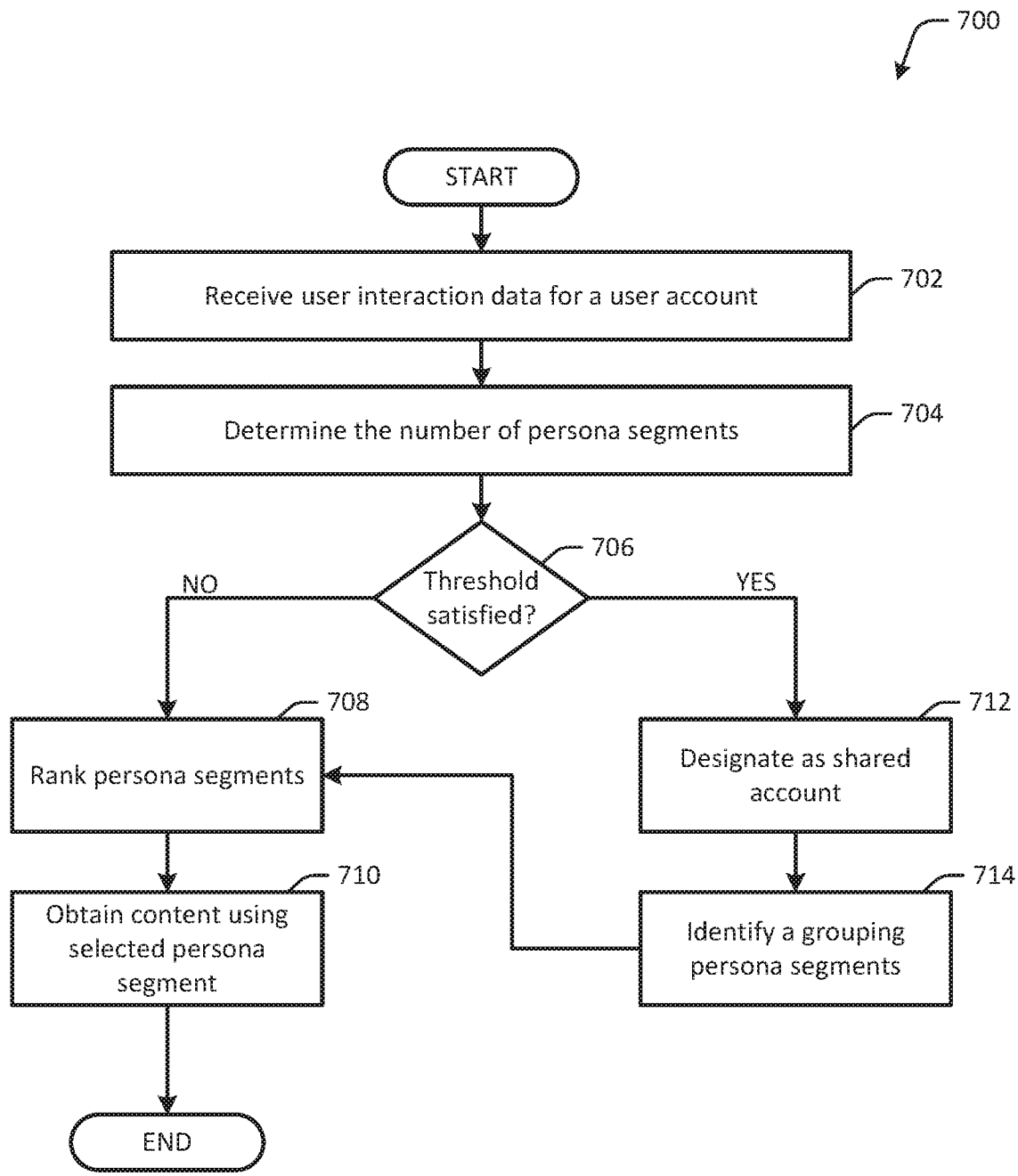
FIGS. 7A-7C are example process flow diagrams identifying multiple users associated with a user account for content delivery based on persona segments in accordance with one or more embodiments of the disclosure.
Figure 7B:
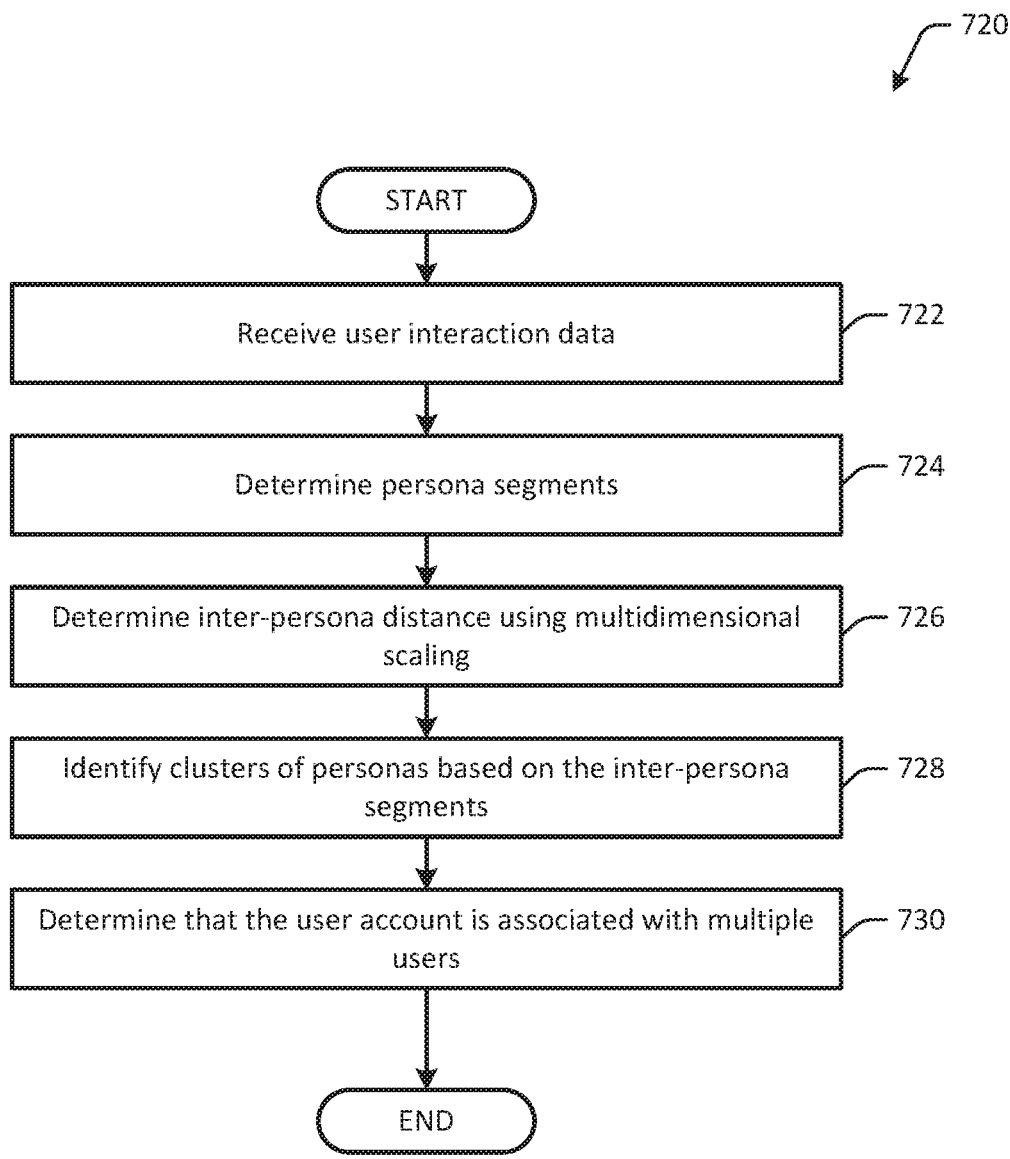
Figure 7C:
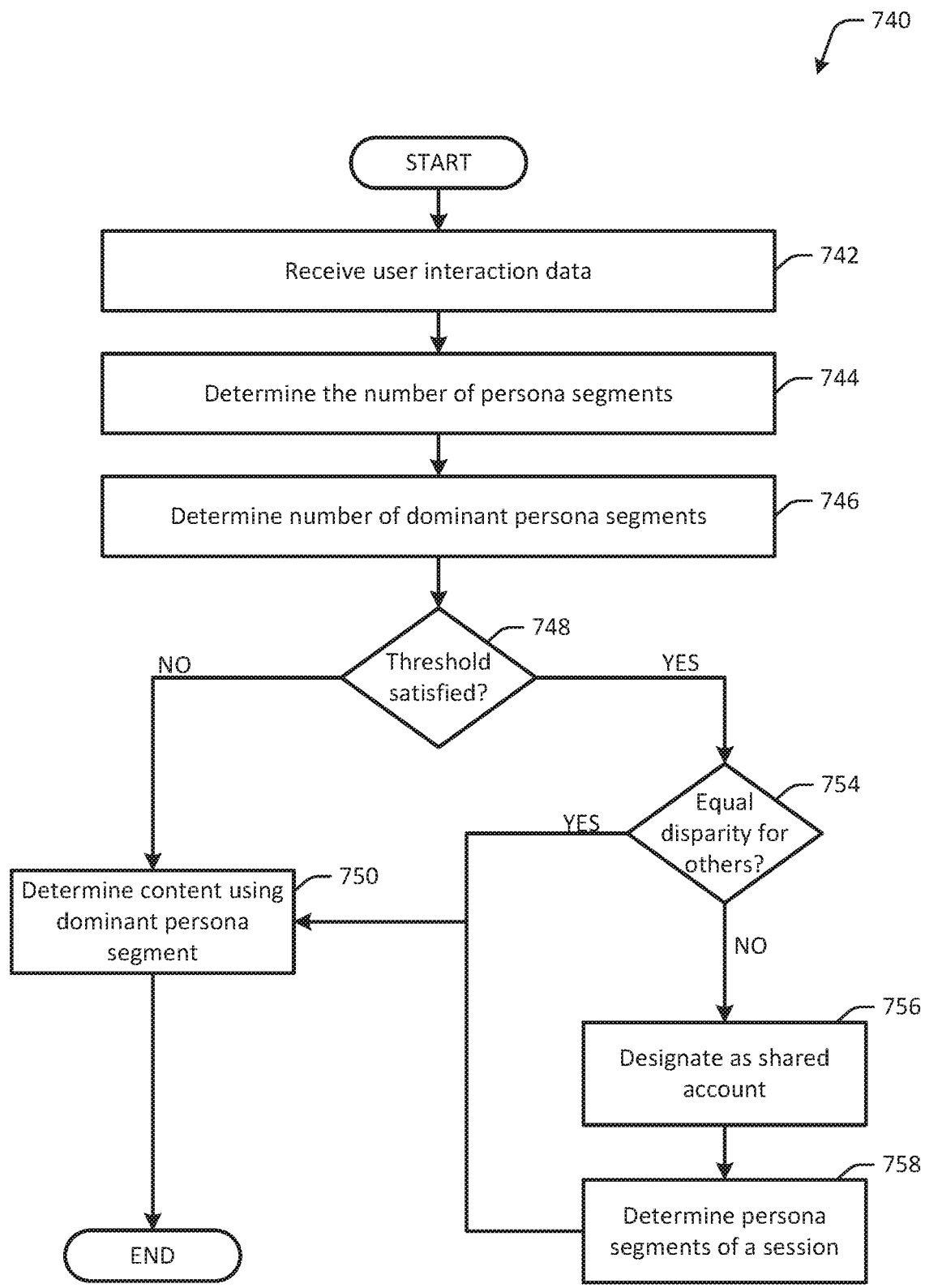

FIGS. 7A-7C are example process flow diagrams 700, 720, 740, that represent different processes for identifying multiple users associated with a user account for persona identification based on user interaction data 305 in accordance with one or more embodiments of the disclosure.

Now referring to FIG. 7A, an example process flow diagram 700 identifying multiple users associated with a user account for persona identification based on user interaction data 305 in accordance with one or more embodiments of the disclosure is depicted. At block 702, an analytics server 115 may receive user interaction data 305 for a user account. In some embodiments, the user interaction data 305 received may be clickstream data or voicestream data. In some embodiments, the user interaction data 305 may be received from different user devices 105A, 105B, 105C and/or different sessions associated with a user account. In some embodiments, the user interaction data 305 may be filtered using one or more rules. For example, a rule may specify that user interaction data 305 over a year old may be excluded. Filtering the user interaction date 305 may enable a more accurate indication of user interactions for a user account.

At block 704, the analytics server 115 may determine a number of persona segments 110 through a process, such as described in relation to FIG. 6. For example, the analytics server 115 may identify product identifiers from the user interaction data 305. The analytics server 115 may generate a collection of keywords 310 based on the product identifiers. The collection of keywords 310 may be transmitted by the analytics server 115 to a targeting server 120. The targeting server 120 may provide the collection of keywords 310 to a machine learning algorithm to identify one or more persona segments 110 that correspond to a user account identifier 130. In some embodiments, the analytics server 115 may receive a set of persona segments 110 from the targeting server 120 and may determine the number of persona segments 110 that correspond to the user account identifier 130.

At block 706, a determination whether a threshold has been satisfied may be made. The analytics server 115, for example, may identify a predetermined threshold. In some embodiments, the threshold may indicate a minimum number of persona segments 110 to determine if a user account is shared by multiple users. In some embodiments, the analytics server 115 may compare the number of persona segments 110 that correspond to a user account identifier 130 to the predetermined threshold. In some embodiments, the predetermined threshold may be based on a determination that an average user is associated with 5-7 persona segments 110. For example, the threshold may be set to 10, which would indicate that a user account with more than ten persona segments 110 associated with it is likely being used by more than one user.

At block 706, a determination may be made whether the number of persona segments 110 satisfies the predetermined threshold. If the number of persona segments 110 does not satisfy the predetermined threshold, the method may proceed to block 708, where the set of persona segments 110 are ranked based on scores that were calculated for each persona segment 110 corresponding to a user account identifier 130. A dominant persona segment 110 may be selected based on the respective scores of the persona segments 110 that correspond to the user account identifier 130. At block 710, content may be obtained based at least in part on the selected persona segment 110. For example, the dominant persona segment 110 may be used to generate or create target criteria. The target criteria may be used in a targeting search query to identify content 320 relevant to the dominant persona segment 110. In some embodiments, the semantic attributes associated with the dominant persona segment 110 may be used to generate the target criteria. In some embodiments, the dominant persona segment 110, related information (e.g., user account identifier 130, session identifier 132, user device identifier 138, etc.), and target criteria may be transmitted to a content delivery server 125, which may use the target criteria to identify content 320. The content 320 may be transmitted from the content delivery server 125 to the analytics server 115, which may transmit the content to the user device 105A or the content delivery server 125 may transmit the content 320 to the user device 105A using the related information.

If at block 706, it is determined that the number of persona segments 110 satisfies the predetermined threshold (e.g., exceeds the predetermined threshold), then the method may proceed to block 712. At block 712, the user account may be designated as a shared account. In some embodiments, metadata may be generated to indicate that the user account is shared by multiple people. In some embodiments, the metadata may be associated with the user account identifier 130 of the user account.

At block 714, persona segments groupings of persona segments 110 may be determined for a session. The different groupings of persona segments 110 may correspond to different individuals that utilize the same user account. The user account identifier may generate a profile for each grouping of persona segments 110 to track the different persona segments for different users. The profiles may not directly identify a user (e.g., name, username, address, etc.) and may only be affiliated with the different persona segments to track the different groupings for the different people. For example, in some embodiments, the analytics server 115 may determine that user interaction data 305 originating from one user device 105A, such as a smartphone, should be associated with one grouping of persona segments 110 and a first profile of the user account. The analytics server 115 may determine that user interaction data 305 originating from a different user device 105B, such as a laptop, should be associated with a second grouping of persona segments 110 and a second profile of the user account. The analytics server 115 may identify and associate persona segments 110 using other methods, such as measuring inter-persona distance, as discussed in FIG. 7B. In some embodiments, the analytics server 115 may determine a current or most recent session based on the user interaction data 305. The analytics server 115 may obtain or identify a session identifier 132 from user interaction data 305 for the recent or current session and may determine or identify a grouping of persona segments 110 that correspond to the session identifier 132.

The method may then proceed to block 708, where the persona segments 110 for the first grouping of persona segments 110, which may be associated with a first profile of the user account, are scored and ranked and a persona segment 110 is selected as the dominant persona segment 110 corresponding to the session identifier 132 based at least in part on the ranking of the scores of the persona segments 110. At block 710, the analytics server 115 may use the dominant persona segment 110 to obtain content and send at least a portion of the content 320 to the user device 105A. For example, the analytics server 115 may generate target criteria using the semantic attributes of the dominant persona segment 110 that corresponds to the identified session identifier 132. The content delivery server 125 may use the target criteria (e.g., via a targeting clause or targeting search query) to identify content that satisfy the target criteria and are likely relevant to the user.

Now referring to FIG. 7B, an example process flow diagram 720 identifying multiple users associated with a user account for persona identification based on user interaction data 305 in accordance with one or more embodiments of the disclosure is depicted. At block 722, user interaction data 305 that correspond to a user account identifier 130. The user interaction data 305 may be received at an analytics server 115. At block 724, persona segments 110 may be determined through a process as described in relation to FIG. 6 and otherwise described herein. In some embodiments, a collection of keywords 310 derived from the user interaction data 305 may be transmitted to a targeting server 120, which may use the collection of keywords 310 to identify a set of persona segments 110. For example, the collection of keywords 310 may be provided as input to a machine learning algorithm to identify persona segments 110 that correspond to a user account identifier 130. The set of persona segments 110 may be transmitted to the analytics server 115.

At block 726, inter-persona distances may be determined for the set of persona segments 110 using multidimensional scaling. For example, the Jensen-Shannon divergence may be computed on a persona-attributes distribution and the persona segments 110 may then be projected onto a 2-D plane using Principal Component Analysis (PCA) weights to help understand the semantic differences between persona segments 110 and the associated semantic attributes 136. Each persona segment 110 may have a dimension value that may be represented as a circle on the 2-D plane, with the area of each circle indicative of the dominance of the persona segment 110 with respect to other persona segments 110. In some embodiments, the area of the circle may be equivalent to the dimension value associated with the persona segments 110. In some embodiments, the dominant persona segment 110 may be referred to as the prevalent persona segment. In some embodiments, prevalence of a persona segment 110 may be measured by the number of semantic attributes 136 that appear in the specific persona segment 110 with respect to their overall distribution across all persona segments 110. In some embodiments, this analysis may be provided in a library of a coding language, such as a Python library. Based on the inter-persona distances, it is likely that persona segments 110 that are clustered or closer on the 2-D plane, correspond to the same user, whereas if there are multiple clusters of persona segments 110, it is an indication that multiple users are utilizing the same user account.

At block 728, based on the inter-persona distances, clusters of persona segments 110 may be identified. In some embodiments, the clusters of persona segments 110 may be determined to correspond to specific session identifiers 132. The clusters may be determined to correspond to one or more session identifiers 132 based on the user interaction data 305.

At block 730, a determination is made that the user account identifier 130 is associated with multiple users. Each cluster of persona segments 110 may be identified and associated with a different user of the user account. As user interaction data 305 is received and processed, the appropriate cluster may be identified and corresponding content 320 may be obtained that is relevant to the user that generated the user interaction data 305. For example, the user interaction data 305 may be used to determine a session identifier 132 of a current or most recent session. The analytics server 115 may identify a cluster that corresponds to the identified session identifier 132. The analytics server 115 may generate a score for each persona segment 110 of the cluster. The analytics server 115 may rank the scores for the persona segments 110 of the cluster and may identify a dominant persona segment 110. Based on the semantic attributes 136 of the dominant persona segment, the analytics server 115 may generate target criteria. The target criteria may be transmitted to a content delivery server 125. The content delivery server 125 may use the target criteria to identify or otherwise obtain content 320 that corresponds to the dominant persona segments 110 and may transmit the content 320 to the analytics server 115 to transmit to the user device 105A or may transmit the content 320 to the user device 105A.

Now referring to FIG. 7C, an example process flow diagram 740 identifying multiple users associated with a user account for persona identification based on user interaction data in accordance with one or more embodiments of the disclosure is depicted. At block 742, user interaction data 305 that corresponds to a user account identifier 130 may be received at an analytics server 115. At block 744, persona segments 110 may be determined through a process as described in relation to FIG. 6. In some embodiments, a collection of keywords 310 derived from the user interaction data 305 may be transmitted to a targeting server 120, which may use the collection of keywords 310 to identify a set of persona segments 110. The set of persona segments 110 may be transmitted to the analytics server 115. The analytics server 115 may generate a score for each identified persona segment 110. In some embodiments, At block 746, a number of dominant persona segments may be determined. In some embodiments, a probability or confidence score of each persona segment occurring during a session may be determined. In some embodiments, the score may be indicative of a confidence level that the persona segment 120 corresponds to the collection of keywords. The score may be generated by comparing the number of keywords in the collection of keywords in common with the semantic attributes 136 of the persona segment 120 to the total number of keywords in the collection of keywords. Confidence scores of persona segments 110 may be compared across different sessions that correspond to a user account identifier 130. In some embodiments, the dominant persona segments 110 may be measured by the number of semantic attributes 136 that appear in the specific persona segment 110 with respect to their overall distribution across all persona segments.

At block 748, a determination made be made regarding whether a predetermined threshold has been satisfied. The predetermined threshold may indicate an average number of dominant persona segments 110 that correspond to a user account identifier 130. For example, if the number of dominant persona segments 110 is determined to be above a predetermined threshold, the method may proceed to block 754.

At block 754, a determination may be made regarding the disparity of the remaining persona segments 110 corresponding to the session identifier 132. In some embodiments, aside from dominant personas segments 110, the occurrence of the other persona segments 110 are likely to happen in equal likelihood. The analytics server 115 may remove the dominant persona segments 110 from the set of persona segments 110 and may determine whether the remaining persona segments 110 occur in equal disparity to others in the session.

If at block 754, it is determined that the persona segments 110 of a session do not occur in equal disparity, then the method may proceed to block 756, where the user account is designated as a shared account. In some embodiments, metadata indicating that the user account identifier corresponds to multiple users may be generated. The metadata may be associated with the user account identifier 130. The method may proceed to block 758. At block 758, a dominant persona segment 110 that correspond to a session identifier 132 may be identified or determined. For example, the session identifier 132 of the most recent or current session may be obtained from the user interaction data 305. The method may proceed to block 750.

If at block 748, a determination is made that the number of dominant persona segments 110 does not satisfy a predetermined threshold, then the method may proceed to block 750. If at block 754, a determination is made that the remaining persona segments are equal in disparity among the remaining persona segments 110 of the set, the method may proceed to 750.

At block 750, content 320 may be determined that corresponds to the identified dominant persona segments 110. The analytics server 115 may generate target criteria using the semantic attributes 136 of the dominant persona segment 110. The content delivery server 125 may use the target criteria to identify content that corresponds to the dominant persona segment 110. The content 310 may be transmitted by the content delivery server 125 to the analytics server 115 to transmit to the user device 105A or to the user device 105B. One or more operations of the methods, process flows, or use cases of FIGS. 1-7C may have been described above as being performed by a user device, or more specifically, by one or more program module(s), applications, or the like executing on a device. It should be appreciated, however, that any of the operations of the methods, process flows, or use cases of FIGS. 1-7C may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7C may be described in the context of the illustrative devices, it should be appreciated that such operations may be implemented in connection with numerous other device configurations.

The operations described and depicted in the illustrative methods, process flows, and use cases of FIGS. 1-7C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
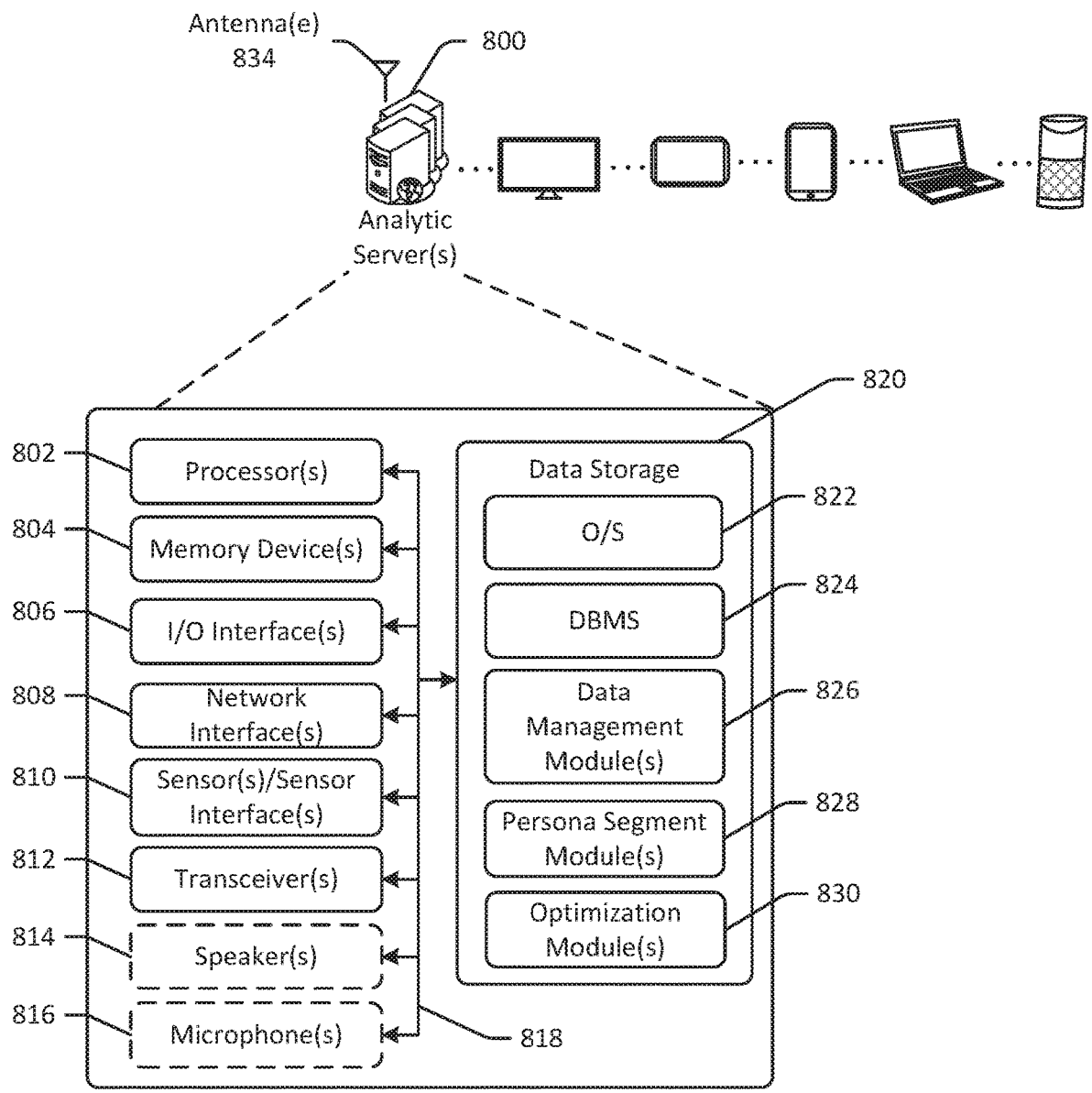
FIG. 8 schematically illustrates an example architecture of an analytics server in accordance with one or more embodiments of the disclosure.

FIG. 8 is a schematic block diagram of one or more illustrative analytics server(s) 800 in accordance with one or more example embodiments of the disclosure. The analytics server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The analytics server(s) 800 may correspond to an illustrative device configuration for the analytics servers of FIGS. 1-7C.

The analytics server(s) 800 may be configured to communicate via one or more networks with one or more servers, user devices, or the like. The analytics server(s) 800 may be configured to obtain webpage content and multi-object content, generating DOM trees, transmitting a DOM tree to a requesting user device, determining to update a content component of the webpage, generating a subtree, transmitting the subtree with instructions to append the subtree to the DOM tree on the user device, and other operations.

The analytics server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the analytics server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The analytics server(s) 800 may further include one or more buses 818 that functionally couple various components of the analytics server(s) 800. The analytics server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the analytics server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the analytics server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more data management module(s) 826, one or more persona segment module(s) 828, and/or one or more optimization module(s) 830. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the analytics server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, web content, advertisement campaigns, advertisements, content items, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the analytics server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the data management module(s) 826 may include computer-executable instructions, code, or the like that responsive to execution by one or more of the processor(s) 802 may perform functions including, but not limited to, receiving user interaction data from multiple user devices 105A, 105B, 105C, identifying sessions associated with a user account, identifying and associating persona segments 110 with a user account, associating persona segment identifiers 134 with persona segments 110, using user account data to obtain or identify associated persona segments 110, sessions, or content 320.

The persona segment module(s) 828 may include computer-executable instructions, code, or the like that responsive to execution by one or more of the processor(s) 802 may perform functions including, but not limited to, keywords from sessions, providing the keywords to a topic model, obtaining or identifying persona segments 110 from the topic model, or the like.

The optimization module(s) 830 may include computer-executable instructions, code, or the like that responsive to execution by one or more of the processor(s) 802 may perform functions including, but not limited to, receiving keywords and/or persona segment identifiers, updating the persona segments, and the like.

Referring now to other illustrative components depicted as being stored in the data storage 820, the O/S 822 may be loaded from the data storage 820 into the memory 804 and may provide an interface between other application software executing on the analytics server(s) 800 and the hardware resources of the analytics server(s) 800. More specifically, the O/S 822 may include a set of computer-executable instructions for managing hardware resources of the analytics server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the analytics server(s) 800 is a mobile device, the DBMS 824 may be any suitable lightweight DBMS optimized for performance on a mobile device.

Referring now to other illustrative components of the analytics server(s) 800, the input/output (I/O) interface(s) 806 may facilitate the receipt of input information by the analytics server(s) 800 from one or more I/O devices as well as the output of information from the analytics server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the analytics server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The analytics server(s) 800 may further include one or more network interface(s) 808 via which the analytics server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna(e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the analytics server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the analytics server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the analytics server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the analytics server(s) 800 may include alternate and/or additional hardware, software, or firmware components beyond those described or depicted without departing from the scope of the disclosure. More particularly, it should be appreciated that software, firmware, or hardware components depicted as forming part of the analytics server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7C may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7C may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, by one or more computer processors coupled to at least one memory, user interaction data from a user device for a session associated with a user account, wherein the user interaction data comprises user interaction events indicative by a user;
determining product identifiers corresponding to products from the user interaction data;
determining descriptive terms for the product identifiers;
determining a set of keywords by aggregating the descriptive terms for the product identifiers;
determining a set of persona segments associated with the user account, the set of persona segments comprising a first persona segment, wherein determining the set of persona segments includes applying a generative statistical model on the set of keywords;
determining a number of persona segments of the set of persona segments associated with the user account;
determining that the number of persona segments is greater than a threshold number of persona segments;
determining, based on the determination that the number of persona segments exceeds the threshold number of persona segments, that the user account is shared by multiple users;
determining that a first subset of persona segments of the set of persona segments is associated with a first profile of the user account;
generating a score for two or more persona segments in the first subset of persona segments;
selecting the first persona segment, wherein the first persona segment corresponds to a highest score from the first subset of persona segments, and wherein the first persona segment is indicative of thematically defined interactions exhibited during the session;
sending a request for content comprising the first persona segment selected from the first profile;
receiving content corresponding to the first persona segment; and
sending the content to the user device for presentation during the session.

2. The method of claim 1, wherein the user device is a first user device and wherein determining the first subset of persona segments comprises:
determining, based at least in part on the user interaction data, that the first subset of persona segments originated from the first user device and that a second subset of persona segments originated from a second user device.

3. The method of claim 1, wherein generating the score for each persona segment of the first profile comprises:
determining a number of matches between semantic attributes of each persona segment and the set of keywords.

4. The method of claim 1, wherein determining the set of persona segments comprises:
applying the generative statistical model on the set of keywords; and
identifying groupings of semantic attributes from the generative statistical model; and
determining each grouping of the groupings of semantic attributes corresponds to a respective persona segment of the set of persona segments.

5. A method comprising:
receiving, by one or more computer processors coupled to at least one memory, user interaction data from a user device for a session associated with a user account, wherein the user interaction data comprises indications of user interaction by a user;
determining product identifiers corresponding to products from the user interaction data;
determining descriptive terms for the product identifiers;
determining a set of keywords based at least in part on the descriptive terms for the product identifiers;
determining a set of persona segments associated with the user account based at least in part on the set of keywords, wherein a first persona segment of the set of persona segments comprises semantic attributes;
determining that the set of persona segments exceeds a threshold number of persona segments;
determining, based on the determination that the number of persona segments exceeds the threshold number of persona segments, that the user account is shared by multiple users;
determining a first grouping of persona segments of the set of persona segments;
selecting the first persona segment from the first grouping of persona segments based at least in part on the user interaction data, wherein the first persona segment is indicative of thematically defined interactions exhibited during the session;
sending a request for content, the request comprising the first persona segment;
receiving content corresponding to the first persona segment; and
sending at least a portion of the content to the user device for presentation during the session.

6. The method of claim 5, wherein selecting the first persona segment comprises:
generating a respective score for two or more persona segments in the first grouping of persona segments; and
selecting the first persona segment, wherein the first persona segment corresponds to a highest score from the first grouping of persona segments.

7. The method of claim 6, wherein generating the respective score for two or more persona segments comprises:
determining a number of matches between respective semantic attributes of the two or more persona segments and the set of keywords, and comparing the number of matches to a total number of the respective semantic attributes of the respective persona segment of the two or more persona segments.

8. The method of claim 5, further comprising:
determining the first grouping of persona segments are associated with a first user device by comparing the semantic attributes of the set of persona segments of the first grouping of persona segments to previously stored user interaction data associated with the user account that includes data indicating that the previously stored user interaction data was generated by the first user device.

9. The method of claim 5, wherein user interaction data is data indicative of at least one of purchase activity, searching, selection of content items, viewing content items for a threshold length of time, interacting with media assets, or creating content.

10. The method of claim 5, wherein determining the first grouping of persona segments further comprises:
generating a Jensen-Shannon divergence on a persona-attributes distribution for the set of persona segments;
projecting persona segments of the set of persona segments onto a 2-D plane using Principal Component Analysis (PCA) weights; and
determining the first grouping of persona segments corresponding to a cluster of persona segments on the 2-D plane.

11. The method of claim 10, further comprising:
determining a respective dimension value for two or more persona segments in the first grouping of persona segments; and
determining the first persona segment for the first grouping of persona segments using the respective dimension value of the two or more persona segments in the first grouping of persona segments.

12. The method of claim 11, further comprising:
generating target criteria using semantic attributes of the first persona segment; and
generating the request for content, wherein the request includes the target criteria.

13. The method of claim 5, determining the set of persona segments based at least in part on the set of keywords comprises:
applying a generative statistical model on the set of keywords; and
identifying groupings of semantic attributes from the generative statistical model; and
determining each grouping of the groupings of semantic attributes corresponds to a respective persona segment of the set of persona segments.

14. The method of claim 5, further comprising determining, based on an average number of persona segments per user, the threshold number of persona segments.

15. A device comprising:
at least one memory that stores computer-executable instructions;
at least one processor configured to access the at least one memory and execute the computer-executable instructions to:
receive user interaction data from a user device during a session associated with a user account;
determine product identifiers corresponding to products from the user interaction data;
determine descriptive terms for each product identifier of the product identifiers;
determine a set of keywords based at least in part on the descriptive terms;
determine, based at least in part on the set of keywords, a set of persona segments associated with the user account;
determine that the set of persona segments exceeds a threshold number of persona segments;
determine, based on the determination that the number of persona segments exceeds the threshold number of persona segments, that the user account is shared by multiple users;
determine a score for at least one persona segment of the set of persona segments;
determine that the user account is shared by multiple users based at least in part on the score;
determine that a first group of persona segments is associated with a first user profile of the user account and that a second group of persona segments is associated with a second user profile of the user account;
select a first persona segment of the first group of persona segments based at least in part on the user interaction data;
identify content based at least in part on the first persona segment; and
facilitate sending at least a portion of the content to the user device.

16. The device of claim 15, wherein, to determine that the user account is shared by multiple users, the at least one processor is further configured to access the at least one memory and execute the computer-executable instructions to:
rank the set of persona segments using the score;
determine that a subset of persona segments satisfies a first threshold indicative of a minimum value of a dominant persona segment; and
determine a number of persona segments of the subset of persona segments; and
determine that the number of persona segments satisfies the threshold number of persona segments, wherein the a threshold number of persona segments is further indicative of an average number of persona segments associated with a user account identifier.

17. The device of claim 16, wherein, to determine that the user account is shared by multiple users, the at least one processor is further configured to access the at least one memory and execute the computer-executable instructions to:
determine that the subset of persona segments comprises a set of dominant persona segments from the set of persona segments;
determine that a number of dominant persona segments of the set of dominant persona segments exceeds a predetermined threshold;
determine a set of non-dominant persona segments by removing the set of dominant persona segments from the set of persona segments; and
determine that a disparity among the set of non-dominant persona segments is not equal.

18. The device of claim 16, wherein the at least one processor is further configured to access the at least one memory and execute the computer-executable instructions to:
generate target criteria based at least in part on the selected first persona segment for the first user profile based on semantic attributes of the dominant persona segment; and
identify the content that using the target criteria.

19. The device of claim 15, wherein user interaction data is data indicative of at least one of purchase activity, searching, selection of content items, viewing content items for a threshold length of time, interacting with media assets, or creating content.

20. The device of claim 15, wherein the at least one processor is further configured to access the at least one memory and execute the computer-executable instructions to:
   determine that the first group of persona segments are associated with a first user device by comparing semantic attributes of the respective persona segments of the first group of persona segments to previously stored user interaction data associated with the user account that includes data indicating that the previously stored user interaction data was generated by the first user device.

* * * * *